US006996539B1

(12) United States Patent
Wallman

(10) Patent No.: US 6,996,539 B1
(45) Date of Patent: *Feb. 7, 2006

(54) METHOD AND APPARATUS FOR ENABLING SMALLER INVESTORS OR OTHERS TO CREATE AND MANAGE A PORTFOLIO OF SECURITIES OR OTHER ASSETS OR LIABILITIES ON A COST EFFECTIVE BASIS

(75) Inventor: Steven M. H. Wallman, Great Falls, VA (US)

(73) Assignee: FOLIOfn, Inc., Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/038,158

(22) Filed: Mar. 11, 1998

(51) Int. Cl.
G06F 17/60 (2006.01)
(52) U.S. Cl. .............................. 705/36; 705/35; 705/37
(58) Field of Classification Search .................. 705/36, 705/35, 37
See application file for complete search history.

(56) References Cited

U.S. PATENT DOCUMENTS

| 4,346,442 A | 8/1982 | Musmanno ............... 364/408 |
| 4,376,978 A | 3/1983 | Musmanno ............... 364/408 |
| 4,566,066 A | 1/1986 | Towers ..................... 364/408 |
| 4,597,046 A | 6/1986 | Musmanno et al. ....... 364/408 |
| 4,642,768 A | 2/1987 | Roberts .................... 364/408 |
| 4,648,038 A | 3/1987 | Roberts et al. ........... 364/408 |
| 4,674,044 A | 6/1987 | Kalmus et al. ........... 364/408 |
| 4,750,121 A | 6/1988 | Halley et al. ............. 364/408 |
| 4,751,640 A | 6/1988 | Lucas et al. .............. 364/408 |
| 4,774,663 A | 9/1988 | Musmanno et al. ....... 364/408 |
| 4,910,676 A | 3/1990 | Alldredge ................. 364/408 |
| 4,933,842 A | 6/1990 | Durbin et al. ............ 364/408 |
| 4,953,085 A | 8/1990 | Atkins ...................... 364/408 |
| 4,980,826 A | 12/1990 | Wagner ..................... 364/408 |
| 4,989,141 A | 1/1991 | Lyons et al. .............. 364/408 |
| 4,994,964 A | 2/1991 | Wolfberg et al. ......... 364/408 |
| 5,038,284 A | 8/1991 | Kramer ..................... 364/408 |
| 5,101,353 A | 3/1992 | Luplen et al. ............. 364/408 |
| 5,126,936 A | 6/1992 | Champion et al. ........ 364/408 |
| 5,132,899 A | 7/1992 | Fox .......................... 364/408 |
| 5,148,365 A | 9/1992 | Dembo ..................... 364/402 |
| 5,193,056 A | 3/1993 | Boes ......................... 364/408 |

(Continued)

FOREIGN PATENT DOCUMENTS

WO    WO 98/44443    10/1998

(Continued)

OTHER PUBLICATIONS

Www.itginc.com/products/posit_more.html, Jun. 2000.*

(Continued)

*Primary Examiner*—Alain L. Bashore
(74) *Attorney, Agent, or Firm*—Kenyon & Kenyon

(57) ABSTRACT

A computer implemented method using aggregation for enabling a user to create and trade a plurality of market tradable assets or liabilities as a single, customizable investment portfolio. An embodiment of the invention includes determining, based on an order to trade a portfolio from a user, a plurality of distinct market tradable assets or liabilities to be transacted in a market for each of the distinct assets or liabilities in a plurality of transactions for the user, aggregating the plurality of transactions for the user with a plurality of transactions for one or more other users over an applicable characteristic of the plurality of assets or liabilities, wherein the aggregating includes aggregating single shares, odd lots and/or fractional shares using a computer, and executing one or more trades based on the aggregating to implement the order to trade the portfolio.

37 Claims, 13 Drawing Sheets

U.S. PATENT DOCUMENTS

| | | | |
|---|---|---|---|
| 5,202,827 A | 4/1993 | Sober | 364/408 |
| 5,210,687 A | 5/1993 | Wolfberg et al. | 364/408 |
| 5,214,579 A | 5/1993 | Wolfberg et al. | 364/408 |
| 5,220,500 A | 6/1993 | Baird et al. | 364/408 |
| 5,227,967 A | 7/1993 | Bailey | 364/408 |
| 5,262,942 A | 11/1993 | Earle | 364/408 |
| 5,270,922 A | 12/1993 | Higgins | 364/408 |
| 5,297,032 A | 3/1994 | Trojan et al. | 364/408 |
| 5,375,055 A | 12/1994 | Togher et al. | 364/408 |
| 5,497,317 A | 3/1996 | Hawkins et al. | 364/408 |
| 5,517,406 A | 5/1996 | Harris et al. | 364/408 |
| 5,649,116 A | 7/1997 | McCoy et al. | 395/238 |
| 5,664,115 A | 9/1997 | Fraser | 705/37 |
| 5,671,363 A | 9/1997 | Cristofich et al. | 395/237 |
| 5,689,650 A * | 11/1997 | McClelland et al. | 705/36 |
| 5,689,652 A * | 11/1997 | Lupien et al. | 705/37 |
| 5,704,045 A | 12/1997 | King et al. | 395/235 |
| 5,710,889 A | 1/1998 | Clark et al. | 395/244 |
| 5,724,524 A | 3/1998 | Hunt et al. | 395/237 |
| 5,729,700 A | 3/1998 | Melnikoff | 395/236 |
| 5,745,706 A | 4/1998 | Wolfberg et al. | 395/235 |
| 5,749,077 A | 5/1998 | Campbell | 705/36 |
| 5,758,097 A | 5/1998 | Debe et al. | 395/235 |
| 5,761,441 A | 6/1998 | Bennett | 395/235 |
| 5,761,442 A | 6/1998 | Barr et al. | 395/236 |
| 5,765,141 A | 6/1998 | Spector | 705/14 |
| 5,774,881 A | 6/1998 | Friend et al. | 705/36 |
| 5,784,696 A | 7/1998 | Melnikoff | 705/36 |
| 5,794,219 A | 8/1998 | Brown | 705/37 |
| 5,799,287 A | 8/1998 | Dembo | 705/36 |
| 5,806,047 A | 9/1998 | Hackel et al. | 705/36 |
| 5,806,049 A | 9/1998 | Petruzzi | 705/36 |
| 5,812,987 A | 9/1998 | Luskin et al. | 705/36 |
| 5,819,237 A | 10/1998 | Garman | |
| 5,873,071 A * | 2/1999 | Ferstenberg et al. | 705/37 |
| 5,918,218 A | 6/1999 | Harris et al. | 705/37 |
| 5,930,774 A | 7/1999 | Chenault | 705/36 |
| 5,946,666 A | 8/1999 | Nevo et al. | 705/36 |
| 5,978,778 A | 11/1999 | O'Shaughnessy | 705/36 |
| 5,999,918 A | 12/1999 | Williams et al. | |
| 6,035,287 A | 3/2000 | Stallaert et al. | |
| 6,044,352 A | 3/2000 | Deavers | |

FOREIGN PATENT DOCUMENTS

| | | |
|---|---|---|
| WO | WO 98/44444 | 10/1998 |
| WO | WO 99/28845 | 6/1999 |

OTHER PUBLICATIONS

J.Z. Money, Apr. 1997, vol. 26, Issue 4, p 82.*

Business Wire p0699 Feb. 29, 2000.*

Robert Barker, A Capital-Gains Miracle Worker, Business Week, Jan. 31, 2000, p. 130.

Anne Tergesen, Here Come the E-Funds, Business Week, Jan. 31, 2000, p. 125.

1998 ADP Investor Communications Services, ProxyEdge™ 2000.

"Welcome to DRIP Central" at http://www.dripcentral.com (2 pages), printed Feb. 20, 2001.

Business Editors; Alaska Air Group Inc. Annoucement; Business Wire; Sep. 1987; one page.

Anonymous; Yearbook Supplement, pp. 95-99; Global Investor; 1995; seven pages.

Anonymous; The 1996 guide to Switzerland Supplement, pp. 2-5; Euromoney; Mar. 1996; seven pages.

Web Pages for "One Share of Stock Inc"; Internet web archive; Dec. 1996; five pages.

John Downes (Editor); Dictionary of Finance and Investment Terms; 1998; Barron's Educational Series, Inc.; Fifth Edition; p. 455.

* cited by examiner

1. YEAR OF BIRTH: _____
2. YEAR OF RETIREMENT: _____
3. MARITAL STATUS (M/S): _____
4. NUMBER OF CHILDREN: _____
5. YEAR FIRST CHILD ATTENDS COLLEGE: _____
6. YEAR SECOND CHILD ATTENDS COLLEGE: _____
7. YEAR THIRD CHILD ATTENDS COLLEGE: _____
8. YEAR FOURTH CHILD ATTENDS COLLEGE: _____
9. COST OF ONE YEAR OF COLLEGE: $_____
10. INCOME: $_____
11. LIQUID ASSETS: $_____
12. LIABILITIES: $_____
13. SPOUSE YEAR OF BIRTH: _____
14. ANNUAL INCOME NEEDED AT RETIREMENT: $_____
15. NUMBER OF LIVING PARENTS TO CARE FOR: _____
16. YEAR OF BIRTH OF FIRST LIVING PARENT: _____
17. YEAR OF BIRTH OF SECOND LIVING PARENT: _____
18. YEAR OF BIRTH OF THIRD LIVING PARENT: _____
19. YEAR OF BIRTH OF FOURTH LIVING PARENT: _____
20. ANNUAL COST OF CARE FOR LIVING PARENT: $_____
21. RISK FACTOR (1-10, WHERE 10 IS HIGH: _____

FIG. 2

OUTPUT OF ASSET ALLOCATION MODEL

TO REACH YOUR ANNUAL INCOME AT RETIREMENT, GIVEN THE LIMITATIONS AND NEEDS YOU HAVE SPECIFIED, YOU MUST INVEST ANNUALLY IN THE FOLLOWING MANNER:

1. LONG-TERM INVESTMENTS: $20,000
2. MEDIUM-TERM INVESTMENTS: $10,000
3. SHORT-TERM INVESTMENTS: $5,000

FIG. 3

PORTFOLIO SELECTION EDITOR SCREEN

1. PRICE TO EARNINGS (P/E) LIMIT: ___
2. CAPITALIZATION FLOOR ($MILLIONS): ___
3. SPECIFIC SECTORS
    A. TELECOMMUNICATIONS: ___
    B. SOFTWARE: ___
    C. COMPUTER: ___
    D. MANUFACTURING: ___
    E. CHEMICAL: ___
    F. BANKING: ___
    G. TRANSPORTATION: ___
    H. MEDICAL: ___
    I. INSURANCE: ___
    J. REAL ESTATE: ___
    K. ENTERTAINMENT: ___
    L. OIL: ___
    M. ENERGY: ___
    N. UTILITIES: ___
4. EXCLUDE COMPANIES WITH NEGATIVE MANAGEMENT PRACTICES (SEE DEFINITION IN HELP): ___
5. EXCLUDE COMPANIES WITH NEGATIVE LABOR PRACTICES (SEE DEFINITION IN HELP): ___
6. EXCLUDE COMPANIES WITHOUT ORGANIZED LABOR WORKFORCES: ___
7. INCLUDE EMPLOYEE OWNED COMPANIES: ___
8. INCLUDE ENVIRONMENTALLY GREEN COMPANIES: ___
9. INCLUDE ONLY DOMESTIC COMPANIES: ___
10. INCLUDE FOREIGN COMPANIES: ___
11. RISK LIMIT RELATIVE TO S&P 500: ___
12. RATE OF RETURN LIMITATION RELATIVE TO S&P 500: ___

FIG. 4

| COMPANY | RISK RELATIVE TO S&P 500 | DIFFERENTIAL RATE OF RETURN RELATIVE TO S&P 500 |
|---|---|---|
| 1. COMPANY A (2.5%) | 0.91 | -10% |
| 2. COMPANY B (2.5%) | 0.89 | -11% |
| 3. COMPANY C (2.5%) | 0.95 | -5% |
| 4. COMPANY D (2.5%) | 0.94 | -6% |
| 5. COMPANY E (2.5%) | 0.93 | -7% |
| 6. COMPANY F (2.5%) | 0.98 | -2% |
| 7. COMPANY G (2.5%) | 1.10 | +10% |
| 8. COMPANY H (2.5%) | 1.12 | +12% |
| 9. COMPANY I (2.5%) | 0.95 | -4% |
| 10. COMPANY J (2.5%) | 0.90 | -10% |
| 11. COMPANY K (2.5%) | 0.70 | -20% |
| 12. COMPANY L (2.5%) | 1.13 | +11% |
| 13. COMPANY M (2.5%) | 1.5 | +20% |
| 14. COMPANY N (2.5%) | 0.8 | -15% |
| 15. COMPANY O (2.5%) | 1.4 | +12% |
| 16. COMPANY P (2.5%) | 1.2 | +10% |
| 17. COMPANY Q (2.5%) | 1.01 | +1% |
| 18. COMPANY R (2.5%) | 0.99 | -0.1% |
| 19. COMPANY S (2.5%) | 1.15 | +12% |
| 20. COMPANY T (2.5%) | 1.7 | +25% |
| 21. COMPANY U (2.5%) | 1.72 | +26% |
| 22. COMPANY V (2.5%) | 1.55 | +20% |
| 23. COMPANY W (2.5%) | 0.88 | -10% |
| 24. COMPANY X (2.5%) | 0.77 | -15% |
| 25. COMPANY Y (2.5%) | 0.99 | -1% |
| 26. COMPANY Z (2.5%) | 1.22 | +18% |
| 27. COMPANY AA (2.5%) | 1.33 | +22% |
| 28. COMPANY AB (2.5%) | 0.88 | -11% |
| 29. COMPANY AC (2.5%) | 0.9 | -1% |
| 30. COMPANY AD (2.5%) | 1.14 | +11% |
| 31. COMPANY AE (2.5%) | 1.9 | +29% |
| 32. COMPANY AF (2.5%) | 0.6 | -30% |
| 33. COMPANY AG (2.5%) | 0.77 | -15% |
| 34. COMPANY AH (2.5%) | 0.9 | -10% |
| 35. COMPANY AI (2.5%) | 0.92 | -8% |
| 36. COMPANY AJ (2.5%) | 0.91 | -9% |
| 37. COMPANY AK (2.5%) | 0.6 | -30% |
| 38. COMPANY AL (2.5%) | 1.15 | +10% |
| 39. COMPANY AM (2.5%) | 1.55 | +25% |
| 40. COMPANY AN (2.5%) | 1.91 | +30% |

FIG. 5

**SAMPLE RESULTS FROM
USER SELECTIONS AND INDIVIDUAL PORTFOLIO PROCESSING
AS PER FIGURE FOUR (A) ABOVE**

| USER BY RESULT OF PORTFOLIO ADJUSTMENT | SECURITY A | | SECURITY B | | SECURITY C | |
|---|---|---|---|---|---|---|
| | BUY | SELL | BUY | SELL | BUY | SELL |
| USER A | 100 | | 200 | | 100 | |
| USER B | | 50 | | 50 | | 100 |
| USER C | 150 | | | 150 | | 50 |
| NUMBER OF TRADES UNDER TRADITIONAL BROKERAGE; TOTAL = 9 | 2 | 1 | 1 | 2 | 1 | 2 |

FIG. 11

**SAMPLE RESULTS FROM
AGGREGATION OF INDIVIDUAL PORTFOLIOS PROCESSED THROUGH THE
INVENTION'S ALGORITHMS
USED IN FIGURE FOUR (B) BELOW**

| TOTALS | 250 | 50 | 200 | 200 | 100 | 150 |
|---|---|---|---|---|---|---|
| NET USER TRADES | 200 | | 0 | | | 50 |
| NUMBER OF TRADES WITH THE INVENTION: NO NETTING = 6 | 1 | 1 | 1 | 1 | 1 | 1 |
| NETTED = 2 | 1 | | | | | 1 |

FIG. 12

METHOD AND APPARATUS FOR ENABLING SMALLER INVESTORS OR OTHERS TO CREATE AND MANAGE A PORTFOLIO OF SECURITIES OR OTHER ASSETS OR LIABILITIES ON A COST EFFECTIVE BASIS

BACKGROUND OF THE INVENTION

The present invention relates generally to methods and apparatuses for electronically trading and investing in securities or other assets, rights or liabilities, such as commodities or futures. More particularly, the present invention relates to a method and apparatus for electronically trading, including over the Internet, and investing in securities or other assets, rights or liabilities that enables a user, at a reasonable cost, to create and manage a complex portfolio of such securities or other assets, rights or liabilities.

Currently, small investors generally have two choices with regard to making investments in securities. First, they can purchase shares directly and one security issue at a time (for example, buy 1000 shares of Microsoft or an option on Microsoft stock). In this instance of direct purchases (through "brokerage"), the investor is the actual owner of the particular security. Second, these investors can purchase an interest in an instrument (which could itself be a security), trust, corporation or other business vehicle that derives its value from multiple other securities (such as an option on the Dow Jones Industrials or a trust that contains a portfolio of stocks). This second category of intermediary or derivative products is principally comprised of open-end mutual funds (such as the Fidelity, Vanguard, Scudder and other mutual funds) that invest in other securities, and is referred to collectively herein as "funds." In this second case where the investing is done through an intermediary vehicle, the investor owns an interest in the vehicle. That vehicle in turn either owns the underlying securities (like a mutual fund) or simply reflects a value derived from the value of those securities (like an option on the Dow Jones Industrials). Where the investor owns a derivative security, the investor has no interest in the underlying securities (which determine the value of the derivative). Each of these two investment strategies—either trading through brokerage or investing in funds—has disadvantages for the investor, which are described below.

A. Chief Among the Structural Disadvantages Inherent in the Fund Product are:

1. Inability to Select Securities or Monitor Selection of Securities

An investor in a fund is precluded from selecting the individual securities to be included in, or excluded from, the fund's portfolio.

An investor can attempt to select the general type of securities to be included in the investor's overall asset allocation by investing in a targeted fund that, for example, states it will invest exclusively in companies whose business is primarily computer software. But that selection still provides the manager of the selected fund with wide discretion to select from hundreds of securities.

In addition, except for a few targeted funds, it is not possible for the investor to express any preferences—even general ones—regarding matters such as social or moral issues (such as not wanting to, or only wanting to, invest in companies that engage in business with certain governments or have operations in certain sectors, such as defense). Even in those few instances where a targeted fund exists for those types of preferences, the preferences that the investor can have reflected are, at best, very general with the investor having no ability to select specific stocks, either to include or exclude, from the portfolio.

It is also not possible for the investor to control what specific securities a fund will hold in its portfolio, or with what weighting or amounts. Consequently, when the investor invests in a fund, the investor may be investing in securities in which the investor would otherwise prefer not to have an interest, or not as much of an interest. In addition, an investor that invests in multiple funds or that holds other investment securities other than solely one fund, will likely be overweighted or under weighted in particular industries or stocks frequently without his knowledge, and without any mechanism to correct the allocation.

Moreover, an investor investing in a specified derivative product, such as an option on the S&P 500, has no control over the selection of the stocks (beyond selecting a vehicle that will be reflective of the S&P 500), or their weighting, whatsoever.

2. Inability To Control Tax Effects

An investor in a fund receives capital income distributions at the discretion (subject to certain legal constraints), and depending on the management style, of the fund. Funds that churn portfolios generate more capital transactions than funds that do not, but the capital distributions are dependent on the fund's activities—not the investor's.

In most funds, such as typical open-end mutual funds (which account for the overwhelming bulk of all diversified investment vehicles with such funds holding a remarkable $4 trillion of investor money), tax effects "flow through" to the investor. In other words, an investor is saddled with whatever flow through tax effect the manager's activities have generated. The investor has no control over these effects whatsoever.

To attempt to avoid this problem, some investors with sufficiently large holdings to make it worthwhile can engage in complex tax strategies to obtain some flexibility, but those strategies are expensive to implement and not useful for smaller investors.

Alternatively, an investor can invest in a fund that attempts to limit the funds uncontrollable tax effects. For example, a fund that engages in no selection of stocks—such as an index fund or a fund that simply invests in the largest 500 or 1000 corporations—would have little turnover from a manager buying or selling securities in order to adjust the portfolio's holdings. Even in these funds, however, there are purchases and sales by the fund to reflect redemptions or cash contributions by investors. As more investors buy into the fund, the manager buys more of the specified securities. As redemptions occur, the manager sells some of the securities to obtain cash to pay to the fund holders who are redeeming their interests in the fund. Consequently, depending on whether there was a gain or loss on those transactions, holders in these funds, which are generally tax flow-through funds, will usually receive taxable gain or loss, regardless of their desire.

3. Inability To Manage Tax Effects

Invariably, some securities in a fund will have depreciated while the fund overall has appreciated (or vice-versa). It is not possible for the investor in a fund to make the choice to obtain a capital loss by selling depreciated securities or, conversely, if some assets have appreciated while the fund overall has depreciated, it is not possible for the investor to make the choice to obtain a capital gain by selling the appreciated assets. Those transactions in particular securities are made at the discretion of the fund manager for the fund as a whole and affect all investors in the fund.

In those few types of diversified investment vehicles where the tax effects do not flow through, the investor does not obtain any gain or loss from the appreciation or depreciation in the underlying assets. The investor can only sell part or all of his interest in the entire fund (or in the case of a derivative, sell part or all of his interest in the derivative), which will either result in a gain or a loss depending on whether the fund (or derivative) has appreciated or depreciated as a whole relative to the investor's tax basis in the fund.

In all instances, flow through or not, the investor cannot sell some of the securities in the fund (or that comprise part of the value of the derivative), and therefore has no ability to manage for his own benefit the tax effects that originate from the underlying securities in the fund.

4. Inability to Exercise Shareholder Rights or Rights Regarding Reinvestment or Distributions, Etc.

As noted, securities held in a fund are owned by the fund, not the investor who merely holds an interest in the fund (and in the case of derivative securities, there is no ownership interest in the underlying securities at all). Consequently, the investor in a fund has no right to vote the underlying securities, tender (or not tender) them in a takeover contest, elect to receive a reinvestment of dividends, elect to receive a dividend as stock instead of cash, exercise any preemptive rights, or otherwise exercise any other shareholder franchise or other shareholder right that may exist with regard to the securities held in the fund.

5. Inability to Modify or Control Costs

With funds, there are two types of charges: Charges levied upon an investor directly for buying, selling or holding interests in the fund, and charges levied against the fund for managing, advising and providing other services to the fund. Although an investor may be in a position to regulate to some degree the charges directly incurred, either by buying or selling less frequently, or by buying directly from a fund as opposed to through a broker or other intermediary (such as a bank or insurance company) that charges a fee or load, the investor cannot affect or control the charges levied against the fund. Those charges which frequently are based on a percentage of assets under management, are paid by the fund and serve to reduce the returns, or increase the losses, of the fund.

6. Inability to Make Intra Day Modifications

An investor in a fund can make only one investment decision—namely to buy or sell interests in the fund. Because of the structure of open-end mutual funds (the overwhelmingly dominant type of fund), that decision is effective only once per day. For example, an investor who believes the market is going down, or who believes it may be going down during the morning but then believes it is going up in the afternoon has no mechanism, through an open-end mutual fund, to buy based on intra-day prices. All open-end mutual funds are priced as of the close of business—in fact prices are available for such funds only once per day; and all investors—whether buying or selling and regardless of when their order was placed during the day—receive a price as of the close of business. This lack of pricing flexibility is an important consideration for some investors and one that forces them to use brokerage as opposed to mutual funds for their investing.

Certain funds other than open-end mutual funds, such as closed-end funds or some trusts, as well as derivative securities, do trade during the day and therefore can reflect intra-day price movements. Each of these other vehicles, however, has negative characteristics that have made them unpopular with investors, including relatively unchangeable, static portfolios, and they are not generally viewed as substitutes for an open-end mutual fund. In addition, in these vehicles as well, the investor buys or sells only an interest in the fund, not the securities owned by the fund.

7. Inability to Monitor and Control Risk Levels and "Styles" of Investing

An investor in a fund can receive historical information as to risk and returns for the fund. Mutual funds that are actively managed—as opposed to passively managed indexed funds or static portfolio trusts—are managed by individuals, and frequently by teams of individuals, making buy and sell decisions. When some of those individuals depart the fund, the "style" of investing of the fund may change. Even if those individual managers never leave, the market may present them with fewer or greater opportunities to buy or sell securities under a particular "style" than they had before. Or their views as to the market may change and with it their investment mix. Some investors in these funds accept these changes in style and direction and view that as part of what they are paying for with the management fee. Others, however, attempt to select funds based on the funds' supposed risk, sector of interest and other factors (including previous returns). It is not possible to control those factors in these funds in advance, however, unless the fund commits to a mechanical style of investing with extremely limited discretion—which is rare for an actively managed fund.

B. Chief Among the Structural Disadvantages Inherent in the Brokerage Service are:

1. Inability to Create a Diversified Portfolio on a Cost Effective Basis

Under portfolio theory, an investor should seek to create a diversified portfolio when investing. Diversification provides an investor with a similar return with lower risk, or a higher return with the same level of risk, as a non-diversified portfolio. Simply put, portfolio theory dictates that there is no advantage to an ordinary investor in holding a non-diversified portfolio of publicly-traded securities as opposed to a diversified portfolio. Nevertheless, few smaller investors are able to create a diversified portfolio. The obstacles to creating such a portfolio for the smaller investor have been the inability of the ordinary investor to be able to craft such a portfolio on his own, combined with the costs of engaging in the trading necessary to create and maintain such a portfolio, and the inability to consummate trades in small quantities needed to create such a portfolio. Consequently, most investors who have understood the benefits, or at least understood that there is a benefit, from diversification have turned to mutual funds. And that desire for diversification has been a primary factor in the explosive growth of such funds, notwithstanding all of the disadvantages of investing in mutual funds as described above.

Costs

The costs for an individual attempting to create and maintain a diversified portfolio stem, in part, from the cost of brokerage. An investor buys or sells individual securities by employing a broker. The broker purchases the selected securities for the investor directly or from a dealer or on an exchange. The costs to a retail investor of purchasing or selling a security are reflected in charges that fall generally into two categories. (For larger institutional orders there are other costs stemming, for example, from the market impact of the order itself—in other words the ability of the existence of a very large buy or sell order to affect the price at which the order will be effected by moving the applicable bid-ask quotes. Other systems (Optimark, ITG-Posit, noted below) have attempted to address this problem for these large institutional investors.)

The first are costs charged directly to the investor in the form of the broker's trading commission. The second are charges levied upon the transaction itself (in terms of a "mark up" or "spread") between the cost at which the security was acquired by the dealer or the exchange specialist from another investor and the cost of the security as it is sold to the investor. This is a cost that frequently is "hidden" from investors: Investors do not always realize that there is, frequently, a spread even when they are being charged a commission. But it can be a significant cost—even exceeding by multiples the explicit commission charges.

Through technology, increased efficiencies and productivity, competition, etc., these costs have been decreasing over time. Nevertheless, all in all costs (including the mark-up or spread) are still on the order (for the deepest discount broker and for the smallest round-lot of 100 shares) of at least tens of dollars per security traded. Moreover, the current view is that the costs have reached a price floor, and without new systems for engaging in trading, such as the present invention, the costs will not be reduced much further.

To create and maintain a diversified portfolio of individual stocks, an investor would have to purchase at least twenty to fifty stocks, and be in a position to add to that securities portfolio on a proportionate basis as new dollars are received to make additional investments. In other words, an investor would first have to create a diversified portfolio by purchasing say fifty stocks, and then continue to purchase stocks in appropriate proportions with any additional amounts sought to be invested on, say, a monthly basis. Obviously, the basic brokerage costs—even employing the deepest discounted brokerage services—would be prohibitive for the ordinary investor. For example, to create and maintain a diversified portfolio, an investor seeking to invest $2,000 per month (a relatively high amount for the ordinary investor), would likely incur minimum brokerage costs for an initial fifty stock purchase of at least (and this would be optimistic) $500—or fully 25% of the initial invested amount. Such charges are obviously prohibitive.

(The best that an investor can do with $2,000 per month to invest would be to try to build such a portfolio for lower costs by buying one or two separate stocks each month and thereby, over a number of years, create a diversified portfolio. Such a strategy has a number of drawbacks as well as taking years to implement. An investor could also add to an already diversified portfolio for a lower cost by making subsequent monthly purchases of just one or two stocks. The drawbacks in terms of lack of flexibility, inability to modify the portfolio, etc.—all similar to the problems with a locked-in portfolio stemming from a mutual fund investment—exist with this strategy as well. Only with investments approaching $10,000 per month—a prohibitive level for most investors—could these costs even begin to be viewed as non-prohibitive on a recurring basis.

As a practical matter then, brokerage costs and constraints eliminate the possibility that the ordinary investor can create and maintain a diversified portfolio on his own, even were the investor to have the tools and skill to be able to do so.

Capability

In addition to prohibitive costs, ordinary investors possess neither the skills nor the tools necessary to create and maintain a diversified portfolio with desired risk-return characteristics. To create such a portfolio, an investor needs to understand risk as it is defined from the perspective of portfolio theory, and have the data and the mechanism for analyzing the data to employ the theory. That data then needs to be correctly employed in connection with a trading system to allow for the cost effective creation and maintenance of the portfolio. There is no brokerage (or other system) that deploys, uses and otherwise acts upon the necessary diversification information, combined with a trading system, so as to be accessible by an ordinary investor. There are, and have been a variety of systems (for example, Schwab One Source (www.schwab.com), Financial Engines (www.financialengines.com) and a new Microsoft site (http://beta.investor.com)) that provide advice to investors as to the creation of a portfolio of mutual funds based on, among other things, risk, style, performance, and ratings. These systems, however, are not designed to enable investors to purchase a portfolio of specific securities (as opposed to assisting in the purchase of specific mutual funds, with all the attendant disadvantages of holding mutual funds) in a cost effective manner, or hold fractional shares in securities (as opposed to interests in funds), or obtain any of the other advantages (described above) stemming from the ability to invest directly in securities as opposed to funds, all as discussed further below.

2. Inability to Purchase Small and Fractional Share Interests

It is possible to acquire small and fractional interests through specific dividend reinvestment plans direct from certain issuers. These plans, however, are run by selected issuers and have a number of significant limitations, including, for example, average pricing usually over the course of weeks or a month.

Purchasing or selling a security through an ordinary brokerage requires transactions to be effected in minimum units of whole numbers. In other words, an investor can purchase no less than 1 share of IBM or sell no less than 1 share of General Motors, and purchases or sales must be whole numbers such as 27 shares, as opposed to 27.437 shares. In addition, costs are frequently prohibitive for small transactions in a security (such as 1 or 2 shares) or even for transactions in less than a round lot (100 shares). An investor buying a round lot in the ordinary security trading between $20 and $40 would be buying at least $2,000 to $4,000 worth of the security. Buying 50 round lots to create a diversified portfolio requires a greater investment ($100,000 to $200,000) than most investors are able to make. As a specific example, then, an investor wishing to invest $150 per week could, through an ordinary brokerage, at best buy 7 shares of a $20 stock, or 3 shares of a $40 stock, invest the balance in cash, and wait for the next week to buy a different stock or more of the same stock.

3. Inability to Select Individual Securities Reflecting Preferences to Be Included Within a Diversified Portfolio Using a broker, an individual obviously can select individual securities for purchase and sale. The brokerage system, however, does not provide a mechanism for readjusting an entire portfolio of holdings as a unified portfolio of investments. Consequently, most investors are likely to be overweighted in a particular security or sector because of the costs of reconfiguring their portfolio and an inability to determine the overall profile of the portfolio: even if the overall risk and other profile characteristics are determined, the investor would not be in a position to act to make the portfolio diversified because of the cost issue described above.

Moreover, brokerage facilities usually do not provide assistance to an investor regarding other factors related to a company, such as social, moral or political considerations that would affect the investors choice of whether to buy or sell the company's stock.

4. Inability to Obtain Superior Trade Executions

Brokers generally execute trades when received, thereby providing "immediate" executions. There are exceptions, however. For example, a trade can be a "limit" order meaning that it can be executed only at a specific price or better. Limit orders are generally executed immediately whenever the price reaches the limit. Trades can also be set for execution at the "open" or "close," meaning the trade will be executed as part of the opening or closing call auction procedures, or upon the satisfaction of certain other conditions or at certain other times as the customer may specify.

As a general matter, under applicable regulatory requirements, customers are required to receive what is called "best execution." But that execution may not be the best price they could have received if the execution system were different. There is frequently a trade-off between price and liquidity. If a customer seeks immediate execution, then the price may be somewhat less advantageous to the customer than if the customer is willing to wait. In addition, if the customer is willing to delay the attempt to execute the order until there are multiple other orders, then the customer could again obtain a better execution because there will be a greater concentration of order flow against which to try to match the order. A number of specialized brokers (and other trading systems) currently permit institutions to hold order flow and try to match the held orders at various times. In addition, many brokers send order flow to others, such as market makers or exchanges, who concentrate order flow so that purchases can be better matched against sales, thereby providing price improvement or better executions than might otherwise occur.

There are trading systems that attempt to obtain improved trading performance for their customers, but these systems serve exclusively as various forms of "matching" mechanisms (although sometimes with very complicated algorithms) that seek to match buy and sell orders. They hold order flow over time or in accordance with specified preferences, such as the Arizona Stock Exchange, which runs periodic call auctions; ITG-Posit, which operates a crossing system that matches buy and sell orders five times a day; and Optimark, which matches buy and sell orders according to various algorithms. In addition, these systems primarily cater to institutions and are not available to the individual investor. In any event, as described more fully below, they do not provide the missing capabilities discussed above.

5. Failure to Monitor Portfolio Based Tax Effects

Although brokers obviously could monitor the overall tax effects of a portfolio for their customers, they generally do not. The concept behind brokerage is usually the selection of individual stocks for purchase or sale, not the creation and maintenance of a diversified portfolio. Consequently, recordation of basis and monitoring gains and losses of securities—as components of a portfolio—would be unusual and is generally not available in most standard brokerage accounts. If a customer does obtain that advice, if it is available at all from the broker, it is usually expensive.

6. Failure to Assist in Exercise of Shareholder Rights

Similar to the problem with tax effects, brokerage is designed to provide assistance regarding individual security transactions, not other matters. Consequently, investors are forwarded materials such as proxy statements without any advice or direction from the broker.

Previously Existing Systems

Electronic trading systems are known. Optimark is a system that allows large institutional investors and others who are concerned about potentially moving the market by placing large orders to place such orders with minimized market impact. It is premised on the concept of a trader having a utility preference function for a particular transaction. As an example, the Optimark system works by having a trader specify how much above the current equilibrium price he is willing to pay to purchase a block of securities. The system then attempts to match that trader's transaction preferences with another trader's preferences in order to complete a trade. The Optimark system therefore engages in price discovery.

ITG-Posit is an electronic equity-matching system that lets users find the other side of a trade during the market day. Posit utilizes mid-point pricing. Buy and sell orders, including individual stocks and portfolios, are entered into the system; five times daily, Posit processes and compares the orders. Posit trades are then priced at the midpoint of the bid/offer spread (the difference between the best seller's asking price and the best buyer's bid) in the stock's primary market when the match is run. Those orders which match are executed. Users can keep unmatched orders in the system for future matches or can electronically route the order to any one of the primary or regional exchanges, to OTC market makers, or complete the order on an agency basis. Posit is used by major institutions and broker/dealers. Posit, like Optimark, is in essence a matching system but Posit matches trades at the mid-point (as determined by a third party system) without independent price discovery. It is premised on traders wishing to trade with each other and provides such traders a potentially better execution (because of the mid-point cross) with lower market impact (because of the anonymity of the trades and the increased available liquidity based on the concentration of trades within certain time frames).

The New York Stock Exchange and the NASDAQ market also both aggregate order flow at the open and the close of the exchanges to match order flow and, of course, concentrate order flow during the day by limiting the number of persons who can trade a security (one specialist per stock on the New York Stock Exchange so that order flow at the Exchange in a particular stock moves through that one specialist, and to "market makers" on the NASDAQ, so that all order flow on the NASDAQ is focussed on the market-makers).

Schwab, Financial Engines (and perhaps Microsoft) provide services that enable users (such as a participant in a 401 (k) plan) to create a portfolio of mutual funds by selecting from among a group of mutual funds available to the participant based on risk/return and other factor analysis. Once the analysis is complete, the participant then selects mutual funds for his portfolio according to what is permitted by his participation rules (if it is a 401(k) plan) or through brokers or others offering the funds. Although for Financial Engines and Microsoft there currently is no direct mechanism for actually executing the desired purchases of fund interests, Schwab does make available the ability to purchase interests in the funds directly through Schwab. There is no mechanism, however, for enabling the participant to do any of this with individual equities as opposed to funds.

Portfolio (or cash) management accounts and similar vehicles exist and are offered by a number of brokerages. They are somewhat mislabeled, however, in that they do not manage portfolios of securities, but simply combine in one reporting statement information regarding various types of assets held by a customer (funds, stocks, bonds, cash, etc.) and consolidate broker relationships. These accounts primarily involve linking of various types of services including credit card, loan, checking/savings, brokerage and mutual fund holdings.

Programs and databases exist that provide raw information regarding volatility and other indicia relative to individual stocks and mechanisms for users to screen stocks to obtain a list of those stocks that meet certain profiles or parameters.

Some mutual fund complexes have made available to their customers the ability to screen mutual funds and determine which fund best fits certain parameters that they make available that a customer would like satisfied—and then lets the customer invest in that mutual fund. For the investor, this system again suffers from all the disadvantages of investing in mutual funds—as opposed to the underlying securities—as described above.

The present invention is therefore directed to the problem of developing a method and apparatus for enabling a smaller investor to create and manage, on a cost-effective basis, a complex portfolio of securities.

SUMMARY OF THE INVENTION

The present invention solves the problem of smaller investors creating and managing on a cost-effective basis a complex portfolio of securities. The present invention does this by providing a computer-based system to which the user provides his preferences regarding his portfolio, which system generates a portfolio that reflects the user's preferences, aggregates orders generated by users at various times during the day for execution, and includes a device for such execution with users being allocated specific interests, including small numbers of (and fractional shares, if needed) in securities.

According to one aspect of the present invention, a system for enabling multiple users to create, manage and trade a portfolio of assets/liabilities includes a processor and a storage device. The processor communicates with the users via multiple communication links, and receives user identification information and trading data from each of the users. The processor aggregates all buy orders and all sell orders for each asset/liability in the trading data from each of the users to obtain a single buy order and a single sell order for each asset/liability. The processor then transmits the single buy order and the single sell order to a third party for execution. The storage device is coupled to the processor and stores the trading data from each of the users.

In addition, the processor creates a percentage allocation of investment classes for each user based on allocation model input from each user and transmits a resulting percentage allocation of investment classes to each user. Furthermore, the processor interacts with each user to determine a user portfolio that corresponds to the percentage allocation of investment classes for the user.

One particularly advantageous embodiment of the above system includes an electronic payment mechanism coupled to the processor and for coupling to a third party electronic payment system. The electronic payment mechanism transmits a request for an electronic payment for each of the users to the third party payment system, and receives, in response to the request, electronic payment data for each of the users electronically from the third party payment system. In addition, the electronic payment mechanism maintains multiple payment accounts, one for each of the users. Furthermore, the electronic payment mechanism only permits trading of the assets/liabilities for a particular user if the particular user's payment account contains a predetermined amount. Moreover, the storage is coupled to the electronic payment mechanism and stores the electronic payment data for each of the users, and the payment accounts for the users.

Further, the system of the present invention can include a second communication link to a third party trading system via which the processor transmits the single buy order and the single sell order for each of the assets/liabilities.

In addition, the system of the present invention optionally includes a user program executing on a user's personal computer, which program prompts the user for user identification information and user preferences, transmits user identification and user preferences to the processor, and enables the user to interact with the processor to select multiple assets/liabilities to create a user portfolio commensurate with the percentage allocation of investment assets. The user program can include a graphical user interface displaying a risk and a differential return of the entire user portfolio relative to a standard industry measurement to the user. Also, the user program enables the user to adjust the percentage allocation of investment assets and the user portfolio. Moreover, the user program communicates user identification information along with any trades of assets/liabilities to be executed to create or modify a user's portfolio to ensure a user's actual portfolio matches a user's desired portfolio to the processor as trading data via one of the communication links.

According to one aspect of the present invention, the system stores the user program in the storage and upon request by a new user transmits the program to the user.

According to another aspect of the present invention, the electronic payment mechanism electronically requests periodic payments from the third party payment system for each of the users. One possibility is that the periodic payment is a monthly payment.

According to yet another aspect of the present invention, the trading data can include fractional shares of the assets/liabilities desired to be traded.

According to yet another aspect of the present invention, the user program maintains tax basis for all of the assets/liabilities traded by the user. The user program can also provides information to the user regarding voting rights of the assets/liabilities held by the user.

According to one aspect of the present invention, the processor receives actual trading pricing information regarding the single buy order and the single sell order for each of the assets/liabilities from the third party trading system. The processor then transmits the actual trading pricing information regarding each asset/liability traded by a particular user to the particular user. In response to the actual trading pricing information received by a particular user, the user program modifies the display of the risk and differential return of the entire user portfolio in accordance with the actual trading pricing information regarding each asset/liability traded by the user. Based on this information, the user program recommends modifications to the user portfolio to the user via the graphical user interface to make the user portfolio match the percentage allocation previously determined if the user portfolio no longer matches the percentage allocation as a result of the actual trading pricing information received from the processor.

According to another aspect of the present invention, at least one of the communication links to the user includes a communication link to the Internet. Furthermore, the system can include a graphical user interface displayed on a predetermined world wide web site via which a new user can provide user identification information to the system. In this case, the processor upon receipt of user identification information from a new user accesses the new user via one of the communication links in accordance with the user identification specified by the new user to obtain payment information from the new user. This communication link can include a direct dial telephone connection, a direct dial-up telephone connection initiated by the user, a direct dial-up telephone connection to an intermediary server, which direct dial-up connection is initiated by the user, and a network connection from the intermediary server to the processor initiated by the intermediary server, a first direct dial-up telephone connection to an intermediary server, which first direct dial-up connection is initiated by the user, and a second direct dial-up connection to the processor, which said second direct dial-up connection is initiated by the intermediary server.

According to another aspect of the present invention, a personal computer based program for executing on a user's personal computer, for enabling a user to create, manage and trade a portfolio of assets/liabilities and for interfacing with a system for managing a plurality of such users via a first communication link over which the user transmits to the system trading data regarding trades of at least one asset/liability that the user desires to make, includes the following elements. A graphical user interface prompts the user for user identification information, and user preference data. An asset allocation modeling process creates a percentage allocation of assets for the user based on the user preference data, wherein the graphical user interface displays via the computer display multiple assets/liabilities among which the user can select to create a user portfolio commensurate with the percentage allocation of assets. A risk and differential return calculation process calculates a risk and a differential return of the entire user portfolio relative to a standard industry measurement, and provides the relative risk and differential return to the graphical user interface, which displays the relative risk and differential return to the user. A portfolio editor process enables the user to adjust the user portfolio. A communication process communicates the user identification information along with any trades of assets\liabilities to be executed to create or modify a user's portfolio to ensure a user's actual portfolio matches a user's desired portfolio to the system as said trading data via the first communication link. In this program, the graphical user interface can display the relative risk and differential return as a color code, a numerical indicator, an arrow on a dial, or an arrow on a range of numerical values.

According to another aspect of the present invention, the program includes a configuration control process that provides a version number of the program to the system in response to a request from the system, wherein the system downloads an updated version of the user program upon detection of an out of date version.

According to another aspect of the present invention, a method for creating and managing a portfolio of assets or liabilities by performing a plurality of transactions, includes the steps of: a) obtaining user preferences for portfolio characteristics of a user; b) employing the portfolio characteristics to describe and select assets or liabilities to be transacted in multiple transactions by a user; and c) aggregating the transactions of a single user with the transactions of other users over an applicable characteristic of the assets or liabilities. In this case, the transactions can be aggregated over a time, such as every three hours, once per day, or multiple times per day at predetermined times. Once the transactions are aggregated, they are then executed.

According to another aspect of the present invention, the method can include the step of netting the transactions against the transactions of other users after aggregating the transactions, and then executing any remaining transactions after netting.

According to yet another aspect of the present invention, an apparatus for enabling a plurality of users to make periodic investments in a portfolio of securities includes a processor and a storage device. The processor receives data from each of the users regarding amounts of money to be invested in each user's portfolio, and accesses an electronic payment system upon receiving instructions from a user to purchase securities to obtain payment for the required purchases. The storage unit stores each user's portfolio. This apparatus can optionally include a third party trading system interface device that aggregates all users' trades and sending the aggregated trades as a single trade in each security to a third party trading system, which orders can optionally be netted before sending them out to the third party trading system.

BRIEF DESCRIPTION OF THE DRAWINGS

FIG. 2 depicts a sample user input questionnaire for use in an asset allocation model.

FIG. 3 depicts a sample output of an asset allocation model.

FIG. 4 depicts a sample portfolio editor screen according to the present invention.

FIG. 5 depicts a sample output of the portfolio selection process of the present invention.

FIGS. 9–12 depict a flow chart of the processing occurring at a Web server in connection with creating or modifying a small sample portfolio according to the computer-based system of the present invention.

DETAILED DESCRIPTION

Figure 1:
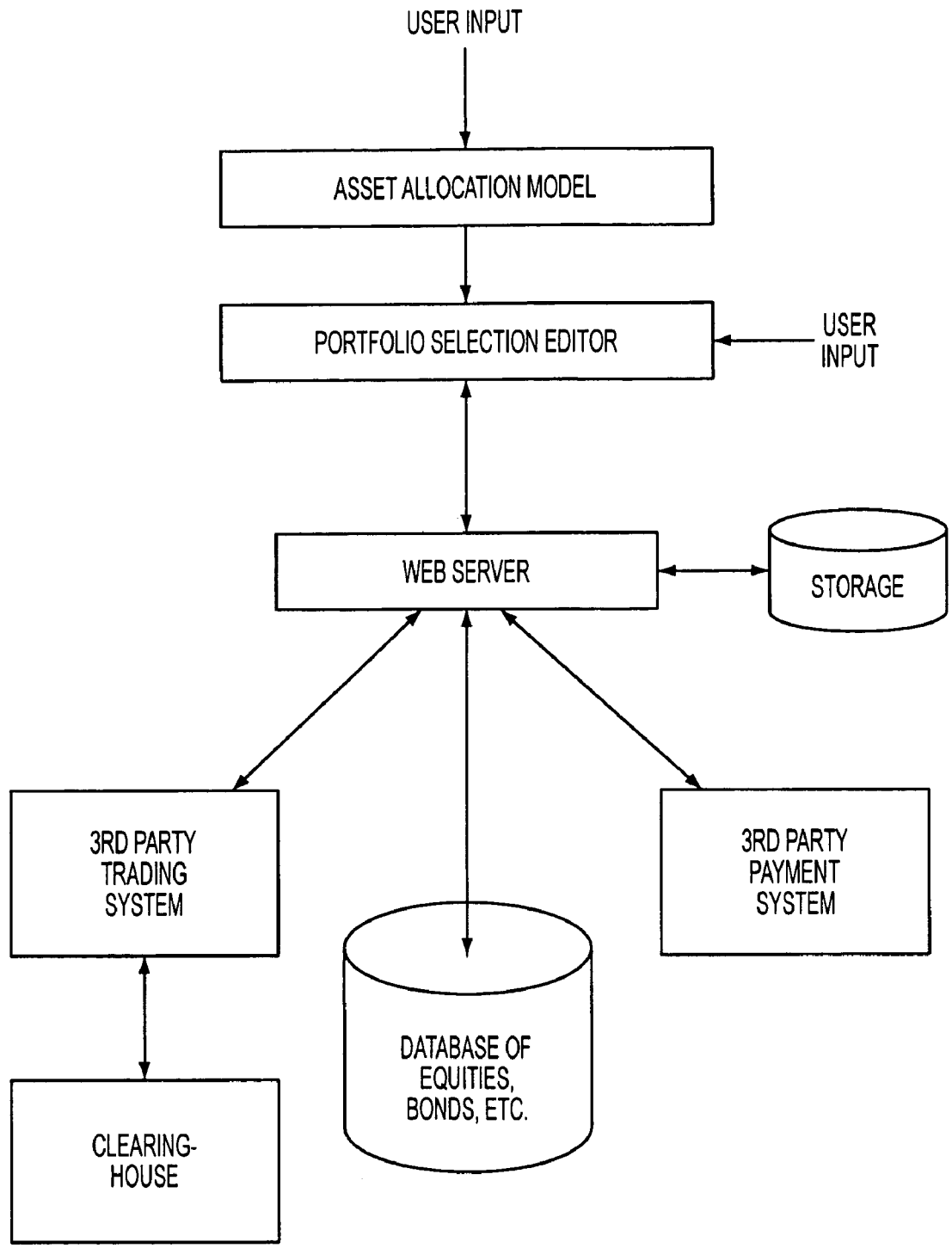
FIG. 1 depicts the process according to the present invention in block diagram format.

Although the computer-based system of the present invention can be used with regard to any asset or liability that is traded, the discussion herein relates primarily to its use in connection with securities for simplicity purposes.

The present invention consists of a computer-based system that provides users a convenient and simple mechanism for investing small amounts on a periodic basis, and a Personal Computer based program for managing a portfolio of securities, including the ability to make adjustments to the portfolio by selling or purchasing securities to modify the portfolio, for monitoring tax effects, for passing through voting rights of the securities and for delegating such rights to third parties at the discretion of the user.

In addition, the structure of the system of the present invention allows its cost to be based on access to or usage of the system (such as a monthly fee) as opposed to according to securities orders entered into the system, as per common brokerage. The result is that the user can cost-effectively create a portfolio of securities comprised of directly owned individual securities with attributes similar to a mutual fund, such as diversification.

The underlying purpose and principal theme embodied in the computer-based system of the present invention is that investors should be able to invest in tradeable assets as a portfolio instead of as a collection of individual assets. In other words, as portfolio theory teaches, the value of an asset to a portfolio is different from the value of the asset by itself; the computer-based system of the present invention, therefore, permits investors to make investment decisions based on the effect on the investor's portfolio, and to create and maintain a diversified portfolio.

The computer-based system of the present invention as compared to funds, among other things, provides:

1. Complete control for the user over what securities can be selected, and in what weights and amounts.

2. Control over the tax effects of purchases or sales of the securities included in the portfolio, preventing the user from being presented with unwanted taxable gain or loss due to discretionary sales transactions of fund managers.

3. All the information necessary to monitor and manage tax effects and the capability to sell or buy the individual securities in his portfolio to obtain desired tax benefits.

4. All shareholder rights with respect to each security in the portfolio to the user and full ownership and control over all investment, voting and other decisions regarding such securities.

5. Direct control over the charges and expenses that will be incurred.

6. The possibility of making multiple intra-day investment decisions by the user, if he wishes.

7. Control over all factors in the portfolio and modification of them as the user sees fit.

Furthermore, compared to existing brokerage services, the computer-based system of the present invention:

1. (a) Reduces costs because the system aggregates order flow, limits the number of actual trades that need to be made external to the system, directs investors to specified securities to further concentrate the order flow, and automates the input process (Consequently, the system's charges to the investors for the creation of a portfolio can be far less—on the order of one to two orders of magnitude less—as compared to even deep discount or non-discount brokers, respectively.); and (b) Enables a user to select individual securities reflecting his preferences to be included within a diversified portfolio by stepping the user through all the issues for creating and managing a diversified portfolio and by providing the method and apparatus necessary to create and manage such a portfolio.

2. Enables a user to acquire fractional and small numbers of shares, thereby permitting the cost-effective creation and maintenance of smaller, but diversified, portfolios. As a result, the computer-based system of the present invention permits even a very small investor to create and own a diversified portfolio of securities (or any other assets or liabilities) for any amount, even if all of the shares are fractional amounts!

The computer-based system of the present invention permits, without incurring any additional costs, investors to purchase or sell small—and even fractional—units of shares. This is because the system aggregates orders provided by its users, executes the aggregated transactions and then allocates the acquired (or cash for sold) shares back to the accounts of the users. (Since transactions outside of the system must still be made in full share amounts, it is possible that a fractional share amount could remain after the allocations. For example, 7½ shares of a stock could be allocated to 15 different accounts—with ½ share allocated to each. To effect this transaction, if the shares had to be acquired from non-users of the system, the broker operating the system would have had to have acquired 8 shares. The remaining ½ share would be owned by the broker operating the system and held for allocation as needed in subsequent rounds of trading.) Consequently, an investor could have $150 per week invested in 50 stocks, receiving an allocation to his account of fractional shares. Each subsequent week, the investor would have added to his account additional fractional interests in each of these stocks. Over the course of a year with, for example, about $7,800 invested, the investor would have full and fractional shares in his account (if the average stock price were $30, the investor would have on average a little over 5 shares—5.2 shares to be precise—in each of 50 stocks). The system of the present invention permits that full investment each week (or any desired period) in a diversified portfolio, the transactions in small share interests, and the transactions in fractional interests (none of which is possible on a cost-effective basis with ordinary brokerage).

3. Enables a user to select individual securities reflecting preferences to be included within a diversified portfolio, and provides the information and tools necessary to create this type of portfolio for a low cost.

4. Enables superior trade execution by accepting customer orders entered at any time and aggregating them for trading. The computer-based system of the present invention holds the orders (except for those for which immediate execution is desired by the customer) until particular times, such as for example, at least three times per day (the "open" for any orders received since the last close of business, "mid-day" for all orders received during the morning, and the "close" for all orders received during the afternoon). The number of times the system could be traded is in general not limited, and depends to some extent on the number of users. The computer-based system of the present invention takes all the orders that have been entered with it and, at the specified time, aggregates those orders for the purpose of reducing the number of transactions that would have to be executed, thereby reducing transaction costs and providing benefits to investors.

Furthermore, the computer-based system of the present invention includes the capability of netting orders against each other. The remaining orders that cannot be matched are executed internally (to the extent the system is making a market in the securities being traded) or forwarded for execution to a third party execution system (such as an exchange or a market maker).

6. Monitors portfolio based tax effects. In contrast to the prior art, the underlying concept of the computer-based system of the present invention relates to the creation of a portfolio. In that context, the monitoring of the portfolio for tax effects is an adjunct to the transaction history and portfolio monitoring is part of the system. Consequently, the computer-based system of the present invention can track the basis in each of the securities in the portfolio and use that basis to determine the tax consequences at any point in time.

7. Assists in the exercise of shareholder rights. Because the computer-based system of the present invention is designed to assist with regard to portfolios, including the exercise of shareholder rights regarding the portfolio securities, the computer-based system of the present invention offers assistance to users in the form of aggregating not only their order execution, but also their voting or other rights. Consequently, a user can obtain information in connection with his portfolio as to how securities could be voted by a service that analyzes the securities in the portfolio. The user is permitted to direct that the voting be delegated to such service (or other services if multiple services are made available).

System Overview

A block diagram of the process flow according to an exemplary embodiment the computer-based system of the present invention is depicted in FIG. 1. The system 10 includes an asset allocation model 1, a portfolio selection editor 2, a web server 3 with storage 4, a database of tradeable assets or liabilities 6, a third party trading system 5 coupled to a clearinghouse 8, and a third party payment system 7. Information is provided by the user to the computer-based system 10 through a graphical user interface, which is shown in FIG. 1 in two parts as the asset allocation model 1 and the portfolio selection editor 2.

In the asset allocation model 1, a user is first queried for answers to a series of questions that determine user data (e.g., name, address, payment information, etc.), the user's risk tolerance and financial goals and objectives, the user's current assets and liabilities, the user's current and expected income and current and expected expenditures and time frames (e.g., college education for children within 10–15 years, care of a parent within 5–10 years), the user's preferred risk-return characteristics, the user's preferences for various types of securities and preferred portfolio mix, and various other items. The output of the asset allocation model is an amount that the user should invest in long-term investments, medium-term investments, and short-term investments. The asset allocation model determines a percentage allocation in each of the investment types according to a set of known tables. There are many existing asset allocation models, any of which can be employed in the present invention, such as that provided by Quicken™, or Financial Engines (www.financialengines.com). An exemplary questionaire used for input to any of the above asset allocation models is depicted in FIG. 2. FIG. 3 depicts an exemplary output of such an asset allocation model.

The user can enter the system at various stages, however, and need not answer all the questions. For example, the user could start at the beginning, presenting all the basic information about age, income, liabilities, financial goals, etc. In that instance, the computer-based system of the present invention utilizes any of the known and publicly available asset allocation models, or a combination of such models, to provide information to the user as to the percentage of investable assets that should be allocated to short-term liquid investments (such as a money market fund, or short-term government or investment grade bonds), medium term investments such as medium term bonds, and long-term investments (such as equities, private placements or the like).

Once this percentage allocation is determined, the system enables the user to select a portfolio of tradeable assets or liabilities. This selection involves providing among other things an indication of the historical levels of risk of each of the tradeable assets or liabilities to the user.

Once the user selects his desired portfolio, that portfolio may include different historical levels of return than necessary to achieve the user's stated financial goals. Consequently, the present invention provides an indication to the user that these selections now require a modification of the percentage allocation to reach his investment objectives. The system does this by comparing the historical rates of returns of the user's portfolio to the rates of return assumed in the asset allocation models, and when determining a difference exists, adjusting the percentage allocation to correct for the difference so that the desired financial goals can be achieved within the constraints set by the user. To the extent these goals cannot be achieved, the present invention informs the user than the risk return levels are not sufficient to reach the established goals. Moreover, the system provides further information to the user as to what returns and levels of investment would be necessary to satisfy various financial goals modified to take into account the user's risk preferences as provided to the system.

In addition, the asset allocation model is utilized to give probabilistic estimates of the likelihood of meeting those goals given various asset allocations. In the case where the user steps through this series of inquiries in the asset allocation model, the user is presented with an output that is then used as an input to the next stage—namely, building the specific portfolio.

Unlike the normal use of an asset allocation model, however, the amount to be allocated to various asset classes is informed by the user's preferences—not just the user's demographic and asset/liability/income/expenditure information. By way of example, take two user's who are identical in every respect regarding their assets and income and expected income from their jobs, their liabilities and expected expenditures, and financial goals for retirement, etc., except for their risk tolerance and preferences. One user is very risk adverse, the other very willing to take risks. The usual asset allocation models would prescribe identical allocations to each. But if some significant allocation in equities is necessary to reach the specified financial goals, but the user who is very risk adverse will be unwilling to invest in equities that have ordinary market risk at all, it will be important to adjust the allocation and the actual equity portfolio in which the investments will be made. In other words, while the non-risk adverse user may have, as an example, one-sixth of his investable assets in money market or short-term instruments, one-third in high risk equities, and one-half in intermediate risk instruments, it may be necessary for the risk-adverse user to have a portfolio that has more equities—but ones with lower risk—to satisfy both his financial goals and his risk preferences. Thus, the system of the present invention provides the asset allocation model with additional risk preference information that can be acted upon precisely through specific security portfolio allocation, as opposed to the typical asset allocation model that simply provides for an allocation to "equities" without distinguishing as to which specific equities.

Notwithstanding this potential benefit, a user could completely skip that portion of the interface involved in the asset allocation determination, and move directly to creating a portfolio, such as by stating that the user wishes to invest in equities and would like to create a portfolio based on stated preferences. In this case, the user enters those preferences just as a user starting with the asset allocation determination would have entered these preferences, but without seeking the allocation. The portfolio screens enable selection of securities based on type of business or industry, stock volatility, book-to-earnings ratio or other financial measures, corporate governance or other matters, etc. An exemplary screen for inputting criteria for selecting the securities in the portfolio is depicted in FIG. 4. FIG. 5 depicts an exemplary output of the selection, in which each of the forty securities are equally weighted in the portfolio in terms of dollars invested in each security. Other variations are possible, and depend upon the price of the underlying security, and the total numbers of securities available, and the combined risk factor desired for the entire portfolio.

To accomplish this selection, the portfolio editor 2 accesses the web server 3, which in turn accesses the database 6 of equities, bonds, etc. This database is constantly updated with pricing, capitalization, price to earnings ratio, etc. Each relevant factor of a security is associated with that security. When the user establishes criteria for his portfolio, each of the relevant factors for each security in the database is compared to the criteria, and if they match the security is either included or excluded from the portfolio depending on the particular criterion.

As an example, a user might have stated that they wished to invest solely in large capitalization, software, financial services and entertainment companies based in the United States with no negative corporate governance factors. The system then returns a listing of stocks, including obvious ones that are household names and some that are not. The system then specifies percentages of each stock to allocate to the portfolio in order to insure a reasonable level of diversification (and would alert the user if that could not be done). One example would be dividing the total dollar amount being invested by the number of securities meeting the criteria entered by the user and allocating an equal dollar amount to each of the securities, and if there were fewer than thirty securities, for example, indicating to the user that the proper accepted level of diversification was not achieved. It should be noted that other levels of diversification could be used as lower limits as well.

In addition, the system specifies the level of risk for the portfolio and suggests changes to satisfy the user's preferences. As an example, if there were insufficient companies in the above list, the system would suggest either relaxing the capitalization standard, or including more industries, such as communications, which could be viewed as similar to the non-manufacturing industries selected by the user.

In conjunction with certain of these screens, the user is provided with a response that shows the user, graphically and/or with text and/or number representations, the results of the user's selections. An exemplary portfolio is depicted in FIG. 5. The results include a comparison of the historical inherent risk in the selected portfolio relative to known standards, such as the S&P 500, and the riskiness from the perspective of lost principal, etc. of the portfolio.

The user next specifies the dollar amount to be invested in this portfolio, and the user's order is then be aggregated with the orders of other users. To purchase the defined portfolio, the user must have assets on hand to acquire the securities, which can be obtained through any of various mechanisms, such as a direct deposit to the system, through a check or electronic funds transfer (EFT) to the broker operating the system, by arranging credit to be extended, or by having cash or other securities to be sold on hand from previous transactions, etc. These are depicted in the figures as the third party payment system 7. One of the options offered by the system is a money market fund for excess cash, as well as linked debit card, credit card, check writing facility to reach funds in the user's account and other ordinary and known cash management services.

The system electronically executes the needed transaction at the next transaction window to create the specified portfolio for the user. This transaction is performed in two steps. First, the trades are aggregated and netted within the system 10. Then the excess trades are electronically sent to a third party trading system, such as Optimark. This aggregation and execution of customized orders of individual securities for smaller investors in connection with transaction windows—the ability actually to effect the transaction and create and manage the portfolio of securities—is what allows users to obtain advantages over ordinary brokerage and over selecting and investing in mutual funds, and over those systems that purport to monitor portfolios, either of securities or of funds.

These orders can potentially be executed as netted orders against the orders of other users of the present invention. Any amounts not netted are then executed via normal trading channels.

The computer-based system of the present invention includes the capability to allocate suggested holdings to the user to create a diversified portfolio (which likely will include fractional share interests in stocks). The portfolio created by the computer-based system of the present invention provides the user the benefits of modern portfolio management theory and does so in the context of a system that allows for the creation and maintenance of the portfolio for a cost that is reasonable in light of the portfolio's size.

Additional funds can be added to purchase additional stocks, or amounts of existing stocks, in the portfolio, with such funds being added automatically out of direct deposits of paychecks, for example, or sales of part or all of the portfolio can be effected, numerous times a day. If the user wishes to add or subtract specified stocks, for example for tax purposes where the user wishes to obtain a taxable loss, the system informs the user of the effects of the change or the portfolio's diversification and risk levels, etc. But (unless there is some restriction imposed by an employer for example) the user has complete control and can determine to create a completely non-diversified portfolio with only a few stocks in it, if desired, by selecting to have the system acquire or the portfolio be left with only those stocks. Additionally, any of the preferences specified by the user can be adjusted and made effective numerous times a day. If the user changes his preferences, the system will review the user's current holdings and suggest changes to maintain the desired risk/return levels. Similarly, as the actual experience of the securities in the portfolio changes (and obviously in the case of a company, for example, that is acquired and its securities are replaced with cash), the system may suggest changes even if the user's preferences have not changed.

The system can be accessed by the user from a main frame or server at a distant location with the user utilizing a direct dial-up connection or Internet access, through an intermediary such as a bank or broker, or the invention can be embodied in part on the user's computer with the user linking to the distant site through any of these access means to obtain specific information and provide information needed to execute trades. In other words, much of the processing can be completed "off-line" with the connection to the server being required only to obtain updated data or to send an order for a portfolio modification, or completely "on-line" depending on how much of the present invention is made resident on the user's computer.

Overall System

Figure 6:
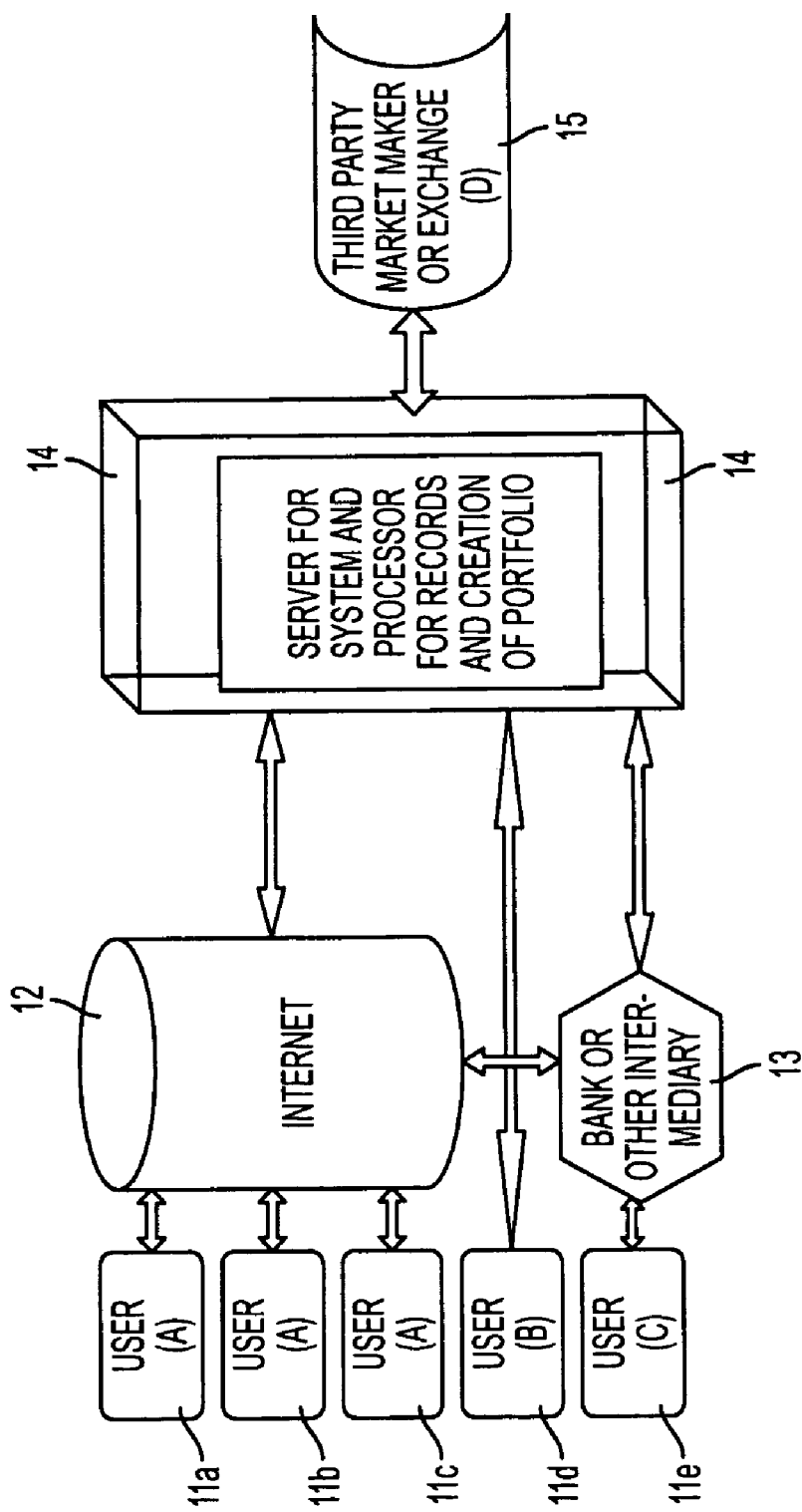
FIG. 6 depicts an overall block diagram of the computer-based system of the present invention.

FIG. 6 depicts an exemplary block diagram of the computer-based system of the present invention. It depicts a user's computer 11a connected to a communication network 12, such as the Internet, which is then connected to a web server 14 that stores the main program for controlling trading and user access. In this diagram, there are two other users' computers 11b, 11c also connected to the web server 14 through the Internet 12. In addition, there is shown a user's computer 11d connected to the web server 14 directly through a dial-up connection. Finally, there is shown a user's computer 11e connected to the web server 14 through an intermediary 13, such as a bank or brokerage, that is providing the system as a service for their customers, which is then connected either directly or through the Internet 12 to such web server 14.

The web server 14 is also electronically connected to other users and traders 15 for executing trades to be made outside of the computer-based system of the present invention through any of a variety of known standard interfaces, e.g., the Financial Information eXchange (FIX) protocol. Some or almost all of the program that performs the method of the present invention can be left resident on the user's computer 11a–11e, with the user accessing the Server 14 to obtain updated information and to provide orders for execution.

Graphical User Interface Program Flow

Figure 7:
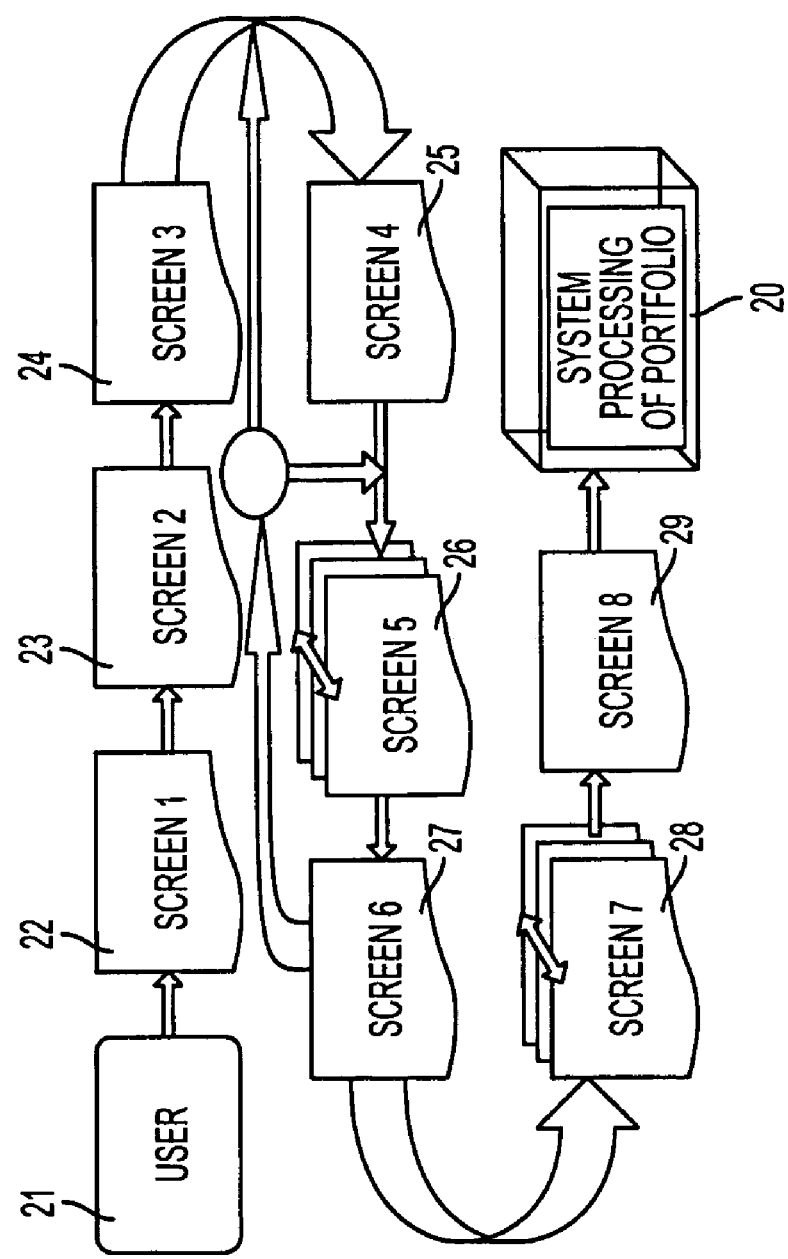
FIG. 7 depicts a flow chart of the graphical user interface presented to the user during the creation or modification of the portfolio according to the computer-based system of the present invention.

FIG. 7 depicts one possible flow chart of the graphical user interface presented to the user during the creation or modification of the user's portfolio.

Screen 1 (22) elicits user identification information to permit log-on (e.g., user name, password and certain other information for security purposes). Once the user enters the appropriate information, the program flow moves to screen 2 (23).

Screen 2 (23) provides instructions for new users for their first time through the system. For existing users the screens are somewhat different, but the general flow is the same. The information provided includes a series of educational facts, links to other sites (such as for academic journals or books on investing or studies posted to the site or other services including e-mail, etc.). Users can bypass this screen by selecting a switch to prevent the program from stopping on this screen during future executions of the program. In any case, program flow then proceeds to screen 3 (24).

Screen 3 (24) provides a listing of options for the user (e.g., create a new account, provide preferences, modify existing portfolio preferences, purchase or sell a specific security, provide wire transfer or other instructions, engage in tax review or planning, monitor price changes in the portfolio, establish weekly dollar contributions to the portfolio for "dollar averaging" or other purposes). The user is also provided the option to navigate through the site and skip over subsequent screens if the user wishes (as would be expected of experienced users seeking to modify or simply review an existing portfolio). Program flow then proceeds to screen 4 (25).

Screen 4 (25) elicits from the user information (see FIG. 2) to create an asset allocation model for the user (again, only if the user wishes, some users may skip this). Generally, an asset allocation model helps a user determine present investment allocations based on current assets and liabilities, current income, future needs and age. In general, the model determines how much should be invested in equities, bonds and cash to reach the goals of the user in the time remaining.

There are many publicly available asset allocation models. For example, Quicken™ includes one as part of its financial planning software. *The Wall Street Journal* also provides one to its subscribers free of charge. Either of these or others can be used to create the asset allocation model based on the user input.

If the user already has entered this information (e.g., the user already has an account in the system), the existing information is then displayed. This screen also elicits information that is used to set the defaults for the creation of the user's securities portfolio. These defaults include preferences for securities with price to earnings ratios above or below a specifiable value, a capitalization value, a type of security (tobacco, utility, defense, transportation, medical, bond, commodity, future, etc.), or other types of classifications often used for securities or investments. That portfolio is adjusted as appropriate to reflect the user's preferences as determined from the factors and parameters set by the user in Screen 5 (26). In addition, this information is used to ensure compliance with various legal requirements, including determining whether the user qualifies as an "accredited investor" or a "qualified investor" under various federal and state laws. To be an accredited investor or a qualified investor an investor must satisfy certain criteria. Once the user has entered this information, the system then verifies this information in the normal manner.

Screen 4 (25) also elicits information from the user that is employed in creating a risk-return preference function for the user. Such information includes volatility levels, risk, required rate of returns (based on the above asset allocation model), etc. The utilization of various parameters to establish that function is then employed to set initial defaults, which can be modified if desired by the user in Screen 5 (26). Program flow then proceeds to screen 5 (26).

Screen 5 (26) provides for the new user, or for an existing user who wishes to modify a portfolio to change preferences, a screen that provides a menu of preferences to set (see FIG. 4 for an example). The menu includes listings for preferences that relate to, among other things (and to be modified over time as user choice dictates): type of security by market capitalization, book-to-market, price-earnings ratio, price of stock, geographic sector, product sector, dividend payout, historic price to current price, earnings growth and similar economic factors, and non economic factors such as specific business lines (for example, tobacco, managed health care or defense that may be viewed as of interest or controversial), engaging in business in particular countries (such as Burma or China or Northern Ireland and ratings from third party sources as to how the selected companies have performed in those countries), executive compensation and other corporate governance factors that are rated by third parties, etc. Depending on which factors the user selects in this screen as being of interest, the user is then presented with either drop down menus or supplemental screens that review the specifics of the selections and solicit additional choices. For example, if the user selects market capitalization as a factor in the selection of stocks for the portfolio, a drop down menu allows the user to select a variety of capitalizations (e.g., eight ranges could be presented, such as a market value of less than $25 million, $25 to 100 million, $100 to 500 million, $500 million to $1 billion, $1 to 2.5 billion, $2.5 to 5 billion, $5 billion to 10 billion, or over $10 billion) which could be selected by clicking and pointing a mouse. If the user wished to obtain more information, such as a sample of companies within each range, then the user would select "more information" or a similar box. The user is then presented with a screen that provides the additional detail that was requested.

When finished with that drop down box or screen, the user then returns to the initial or other screens that are part of Screen 5 (26) and repeats the procedure setting the parameters for any other factors for which the user has preferences.

Alternatively, or additionally, the computer-based system of the present invention also allows the user to be presented with suggested portfolios created through other means—such as a recommended portfolio from a selected analyst, or a selected organization or through collaborative techniques. For example, a noted analyst may state that her ideal portfolio would be the following fifty stocks in the following proportions, or a charitable organization may provide a list of the corporations that have done the most for the charity, and individual donors to the charity may wish to build a portfolio of corporate contributors, or a union may wish to provide a list of companies it works with who it believes are good companies and may recommend that members acquire shares in those companies. In any of these types of cases, Screen 5 would make available the list of companies and the suggested allocations (or if no allocation is provided by the entity creating the list, then in accordance with appropriate diversification requirements, risk and other preferences of the user, as provided previously). Furthermore, the computer-based system of the present invention automatically employs known collaborative filtering techniques, such as those utilized through a Firefly Network system (www.firefly.net) because the system already has the user's preferences entered into the system. In this instance, the user's preferences entered into the system are used to identify securities that may be of interest to the user that have been specifically identified and transacted by others with similar preferences. Entire portfolios can be presented. For example, if a user who enters preferences regarding certain types of stocks then separately determines to buy another specified stock, then if another user enters similar preferences as the first user, that second user could be notified that a user with similar preferences also specifically added for purchase this other security and the second user may wish to look at it. In this manner, the system of the present invention can be used to facilitate the creation of diversified portfolios created by the equivalent of investment clubs.

In any of these analyst, group or collaborative recommendations, the user is able to select the entire portfolio as defined, and specify the dollar amount to be invested as per Screen 8 (29) (or if the user has more securities to include then the user would continue through with the program flow). Consequently, one of the user's preferences and a screen available to the user is a selection of suggested portfolios recommended by particular analysts, groups or others. Program flow then proceeds to screen 6 (27).

In each case, and in each of these screens, the user is presented with a default set of preferences that the system recommends based on the user's stated general goals and the user information entered in earlier screens. For example, if a user specified that he wished very little risk in his portfolio, and high dividend payout, but then selected capitalization exclusively under $25 million, the system alerts the user to the fact that there are insufficient companies that satisfy these preferences to create a reasonably diversified portfolio. The system then recommends that the user permit the system to select from any size capitalization or suggest the user change some of the other parameters that are constraining the choices, such as the dividend payout.

For those factors or parameters for which the user wishes not to make a selection, the system uses defaults to create a portfolio that satisfies the other criteria, if any, that is selected by the user. If no factors or parameters are selected at all, then the system creates a default portfolio based on the asset allocation, risk-return preference and other information, such as age and income, that the user has provided the system. The number of different portfolios that the system can create is extremely large (almost limitless and in any event far in excess of the number of potential users), and there is no expectation that any two users would have identical portfolios (although they could if they so requested (such as members of a family that wish to have separate accounts but identical portfolios, or an individual that wishes to have multiple accounts (such as an IRA and a non-IRA account) with identical portfolios), or if two persons happened to make identical selections on all parameters, or used defaults in all cases with identical age and income ranges, etc.). Essentially, the system engages in an interactive process with the user via the main server and the user program executing on the user's computer. The user's program prompts the user for the information needed by the main server to determine the portfolio or to create the asset allocation model. However, some of these selections made by the user can affect the asset allocation model, such as limiting the volatility, which can cause the program to indicate that the user must increase the allocation of resources to equities to achieve the desired investment goals. Consequently, the process can be viewed as either a two stage process, the first stage of which determines the asset allocation model, and the second stage of which enables the user to select the desired securities in his portfolio, or as a single interactive process during which the user selects both the general categories of investment vehicles and states his investment goals, which are often interrelated.

Screen 6 (27) then presents the user with his choices and selections and seeks confirmation of the choices. If the user wishes to modify any of the choices, the user is then returned to the appropriate prior screen (such as Screen 4 (25) or screen 5 (26) depending on the parameter to be modified). If the user confirms the choices, he moves to Screen 7 (28) which displays the portfolio. Program flow then proceeds to screen 7 (28).

Screen 7 (28) provides the user with the selected portfolio (see FIG. 5 for an example). The portfolio can be presented in a number of different formats for the user. Those formats include: a list of the actual stocks to be included, the relative percentages (see caveat below) each such stock comprises (by expected dollar allocation) in the portfolio and the risk, relative to the average, of each such stock (see below); by type of security selected (such as the percentage that are in one range of market capitalization as opposed to another) and various other factors that reflect generally the factors that can be selected by the user; and, by risk and performance of the portfolio as a whole.

Both risk and performance are based on the historical activity of the stocks and are presented graphically, with portfolios that are riskier than specified averages shown as such by volatility charts, and by words such as "this portfolio, on a historical basis, would lose or gain 10% of its value relative to the [specified] index 5 out of 100 trading days." The portfolio could also be displayed as expected values in dollar amounts based on historical returns and volatilities, with probabilities and sensitivity analyses being performed. The output could be a graph showing the expected distribution of the values (much like a bell shaped curve showing the average expected value and the tails showing the high and low expected values at specified levels of likelihood (or some particular numbers such as "this portfolio would be expected to double in value over ten years but there is also a five percent chance that it will be worth only 60% or less of its current value in ten years."

When the portfolio is displayed as a list of securities to be included in the portfolio, the risk for each such security would be shown graphically, such as by a color or a bar next to the stock. As an example, the bar would be shaded one color (such as yellow) for stocks riskier than the average and another color (such as blue) for those less risky than the average (see FIG. 13 for an example), or the bars would extend to the right of each listed stock for those stocks that are less risky and to the left for those that are more risky. The longer the bar, the further it departs from the average. A user wishing then to increase the level of riskiness in the portfolio can either return to the screen where risk levels are set with the result that the portfolio will be readjusted to be riskier, or select those stocks that contribute to higher levels of risk and increase the allocation to such stock, or add to the level of risk by specifying that margin should be used (in other words, that the user will request a loan from the intermediary running the system or another source to acquire securities on a leveraged basis), thereby increasing the risk level of the portfolio.

More generally, at this point, the user can manually adjust the portfolio in whatever manner he sees fit by increasing or decreasing the selection of a particular stock, or by adding a stock that is not otherwise included in the portfolio and specifying the percentage to be allocated to that stock.

The user is also provided the opportunity to specify whether some or all stocks should not be purchased if the price moves materially beyond the current price at the time of execution. Program flow then proceeds to screen 8 (29).

Screen 8 (29) provides the user with final confirmation of the portfolio, and solicits from the user the amount to be invested in this portfolio. The user enters that information as a dollar amount. Because the precise prices at which the specific stocks are to be purchased will not be known until the time of purchase, the number of shares of any particular stock to be allocated to a particular portfolio needs to be somewhat approximate to accommodate price swings prior to the execution of the trade. With that caveat, the portfolio allocations and the specific securities to be purchased are then stored in the storage on the user's computer and when transferred to the main server stored there as well. The precise number of shares to be purchased and allocated to this user are determined at the next transaction window based on the then current prices for the stocks as they are purchased for the account of that user. The portfolio is then updated and stored by the system for access the next time the user logs onto the system.

Figure 8:
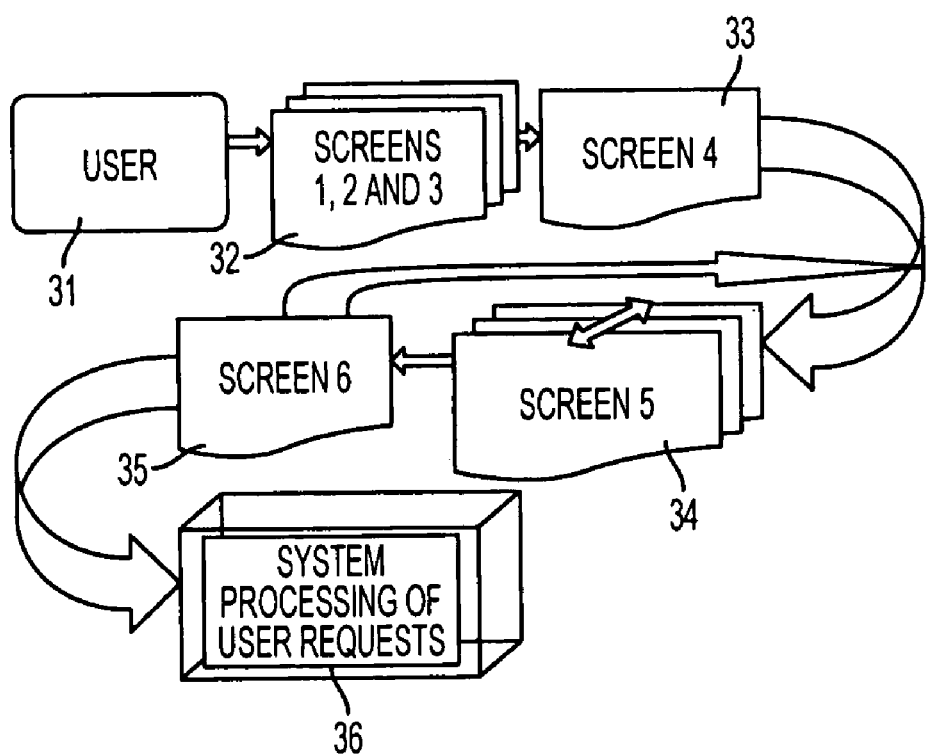
FIG. 8 depicts a flow chart of the graphical user interface presented to the user in connection with the user employing other features of the system according to the computer-based system of the present invention.

FIG. 8 depicts one possible flow chart of the graphical user interface presented to the user in connection with the user employing other features of the system.

Screens 1, 2 and 3 (32*a*, 32*b*, 32*c*) are the same as in FIG. 7, except that a menu is presented as soon as the user logs on that permits him to skip directly to alternate screens without having to sequence through Screens 2 (32*b*) and 3 (32*c*). In other words, the choices in Screen 3 (32*c*) are presented as a "toolbar" upon log-on that the user can directly access in order to move to any of the other screens in the system. After screens 2 (32*a*–32*c*), program flow then proceeds to screen 4 (33).

Screen 4 (33)—the first screen a user sees after the log-on, assuming the user selected alternatives from the "Screen 3-equivalent-toolbar" other than "create or modify a portfolio"—provides a menu of alternative services. Those services are varied, and depend to some degree on the user. For example, offerings of securities pursuant to private placements can be made legally only to "accredited investors." Consequently, the system identifies those users who are accredited investors and provides to them a menu item for reviewing private placement opportunities. Conversely, the system does not provide such a menu item to non-accredited investors who, under current law, cannot receive such offerings. Program flow then proceeds to screen 5 (34).

Screen 5 (34) is the operational screen for the services selected by the user. If, for example, the user wishes to evaluate the portfolio for tax effects, this Screen 5 (34) permits him to do so. The user would specify in the tax effects communications menu the relevant parameters selecting from those available—such as stocks with losses, stocks with gains, long-term versus short-term gain or loss, combinations of the parameters, or all current tax positions. The system would then display for the user the stock positions that satisfy the user's parameters, with dollar amounts listed. Because of the way the system works—allowing for frequent additions of dollar amounts to the portfolio for strategies such as dollar cost averaging, and for frequent adjustments to the portfolio securities themselves, it is possible that a user would have gains and losses in the same stock (for example, if the user had bought 10 shares of a stock at $20 and ten shares of the same stock at $30 and the stock is now trading at $25, the user would have gains and losses in the stock when each transaction is viewed separately). In that instance, the system would display the stock as having both such gains and losses. The user would then be presented with a series of options as to what he would like to do next. These options are smart options and context sensitive so that, for example, a user is able to sell individual securities simply by highlighting those securities in the list and clicking a command something like "sell at next portfolio adjustment." The transaction is then added to the portfolio as an adjustment and executed at the next transaction window. If the user wished to sell immediately, the user would highlight the securities and click "sell immediately" (for which it is contemplated that an extra charge would be levied). In either case a confirmation window either pops-up confirming the user's choice at that time, or the confirmation is deferred to the end (at the user's option) when the user confirms all requested actions.

The computer-based system of the present invention also provides tax preparation as it relates to transactions occurring through the invention. Specifically, as is necessary to provide the gain and loss information as described above, the computer-based system of the present invention tracks the tax basis of securities purchased through the system and the sales price for such securities as well as any costs involved in maintaining the portfolio. Consequently, the system executing the computer-based system of the present invention provides users with a complete downloadable Form 1040 Schedule D as it relates to transactions in the system. That Schedule could then be supplemented with any other capital transactions the user may have. Similarly, the system could provide for one-step exporting of this Schedule D type information to popular tax preparation packages, such as Turbo Tax™, for example. This downloading and exporting enables a user to use the system with a low level of inconvenience.

If the user had selected in Screen 4 (33) another service, such as reviewing private placements if the user is an accredited investor, or reviewing public offerings, or buying or selling specific securities outside of the portfolio, or buying or selling other items that would be offered including, for example, other financial services such as insurance or commodities or futures if permitted by applicable law, or non-financial services such as books or software relating to investments, or if the user wished to engage in chat room activities or discuss selected companies for which the system would host conversations with the executives of such companies, etc., the user would enter any of those other services through this Screen 5 (34).

If the user permits, the system can also rely on the information provided by the user to present the user with other possibilities of interest, along the lines described above, in a more proactive manner. For example, if the user is an accredited investor and specifies an interest in private placements involving Internet-based publishing companies, the system will specifically alert the user, when she next logs-on, to the existence of such am offering, and provide a means for the user to obtain the necessary information to participate.

The user is in a position to move between the operational screens, and engage in a variety of activities as mentioned. Program flow then proceeds to screen 6 (35).

Screen 6 (35) lists the actions the user determined to take in Screen 5 (34), to the extent the actions require a transaction of some sort, and then seeks confirmation of those actions. If the user wishes to modify any actions he is returned to Screen 5 (34) for adjustments. After confirmation, any transactions are effected. The system processes and stores the information if it relates to a transaction or requires portfolio adjustments, etc.

Web Server Program

Figure 9:
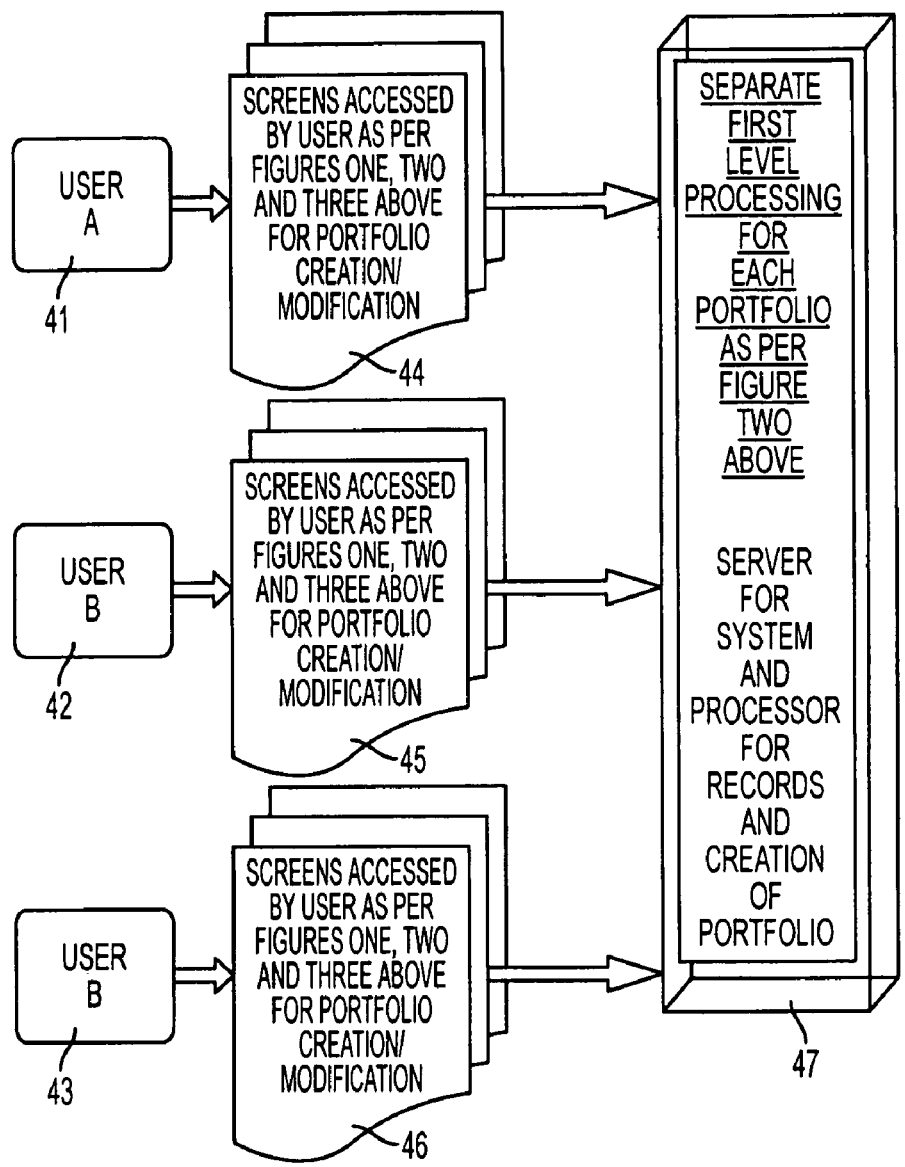
Figure 10:
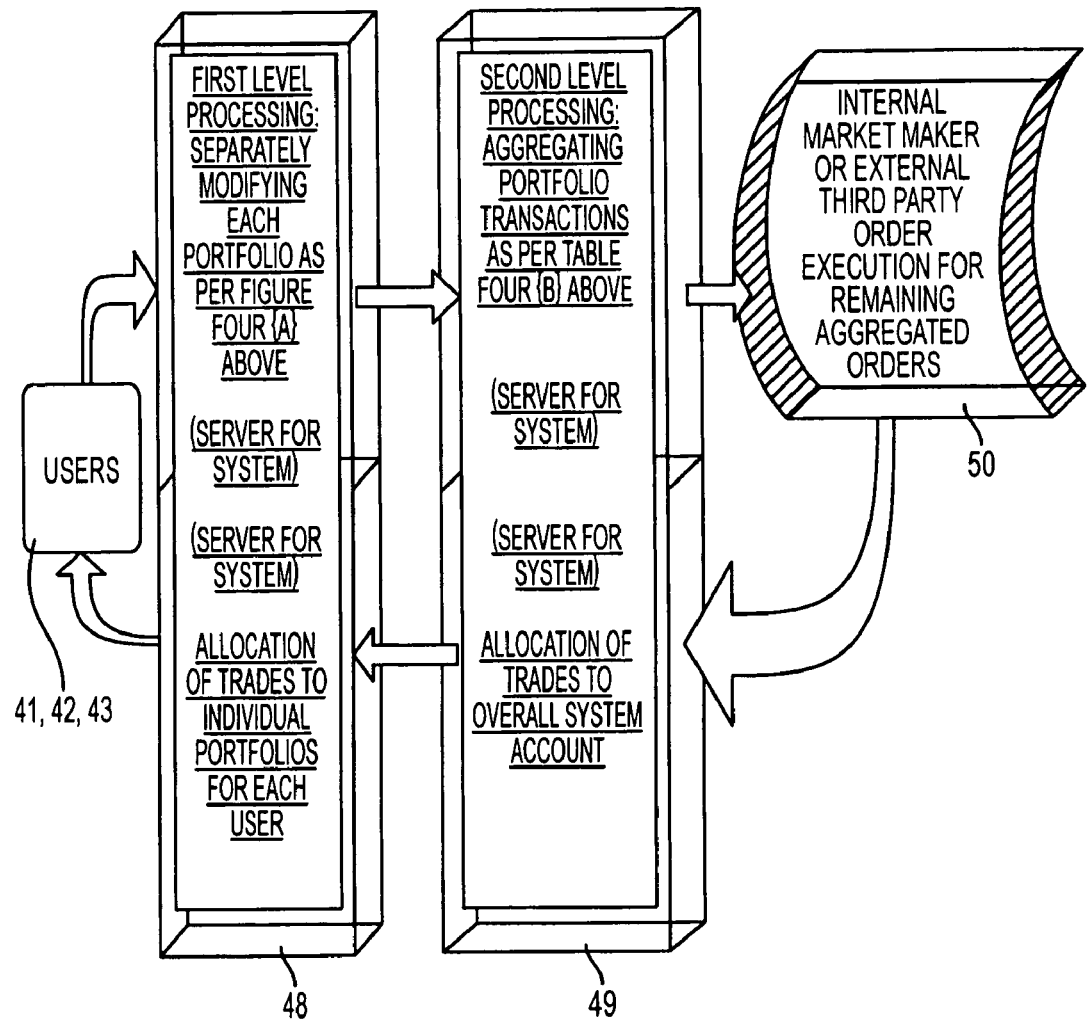

FIGS. 9 and 10—together with FIGS. 11 and 12—depict a flow chart of the processing occurring at the Web server. In general the Web server provides communications between all users and other systems external to the computer-based system of the present invention, such as the third party payment system, and the third party trading system.

FIGS. 9 and 10 show one of the strongest advantages of the computer-based system of the present invention: namely that the number of trades that must be executed externally to the system to implement portfolio adjustments is reduced dramatically. As indicated in FIG. 11, User A wishes to buy 100 shares of security A, User B wishes to sell 50 shares of security A, and User C wishes to buy 150 shares of security A, giving a total of 250 shares of security A to be purchased and 50 shares of security A to be sold through the system of the present invention. The net result is that 200 shares of security A need to be purchased by the system of the present invention, which can be implemented with a single transaction.

Also shown in FIG. 12, User A wishes to buy 200 shares of security B, User B wishes to sell 50 shares of security B, and User C wishes to sell 150 shares of security B, giving a total of 200 shares of security B to be purchased and 200 shares of security B to be sold through the system of the present invention. The net result is that 0 shares of security B need to be purchased or sold by the system of the present invention.

As further indicated in FIG. 11, User A wishes to buy 100 shares of security C, User B wishes to sell 100 shares of security C, and User C wishes to sell 50 shares of security C, giving a total of 100 shares of security C to be purchased and 150 shares of security C to be sold through the system of the present invention. The net result is that 50 shares of security C need to be sold by the system of the present invention, again only one trade needs to be executed externally to the system.

In this example, the number of trades needed to execute portfolio creations or adjustments is reduced from 9 to 2 with netting and from 9 to 6 without netting. As a further example, assume the invention was employed on a system that was being used by 10,000 investors creating and maintaining their portfolios from a list of 750 stocks. Assume further, that each investor is engaging in just five transactions relating to his portfolio during a given period. The number of transactions that would normally have to be sent to an exchange or third party market maker or be executed by the broker as dealer would be 50,000. By contrast, employing the invention, the maximum number of trades the system would theoretically have to execute would be 1500 (two trades—a buy and a sell—in each stock) assuming no netting of buys against sells, and 750 (one trade in each stock) if there is netting of buys against sells, i.e., either a single buy or a single sell depending on whether the total number of shares being bought exceeded the total number of shares being sold or vice versa. In the first case, the computer-based system of the present invention saves the costs associated with 48,500 trades, and in the second case, the computer-based system of the present invention saves the costs associated with 49,250 trades—a ratio of over 30:1 in savings!

The computer-based system of the present invention, therefore, is advantageous with or without netting. As a further illustration, increasing the number of investors in the above example to 100,000 would increase the number of trades under ordinary brokerage to half-a-million. Employing the computer-based system of the present invention, the theoretical maximum number of trades remains at 1500 (or 750 with netting). According to the computer-based system of the present invention, therefore, increasing the number of investors, or the number of transactions they wish to engage in, simply increases the likelihood that the actual number of trades the system needs to execute will more frequently approach the applicable theoretical maximum. Costs therefore can be maintained at a low level in part because so few actual trades need to be executed, even assuming every trade is sent to a third party for execution.

Graphical User Interface During Creation/Modification of User Portfolio

Figure 13:
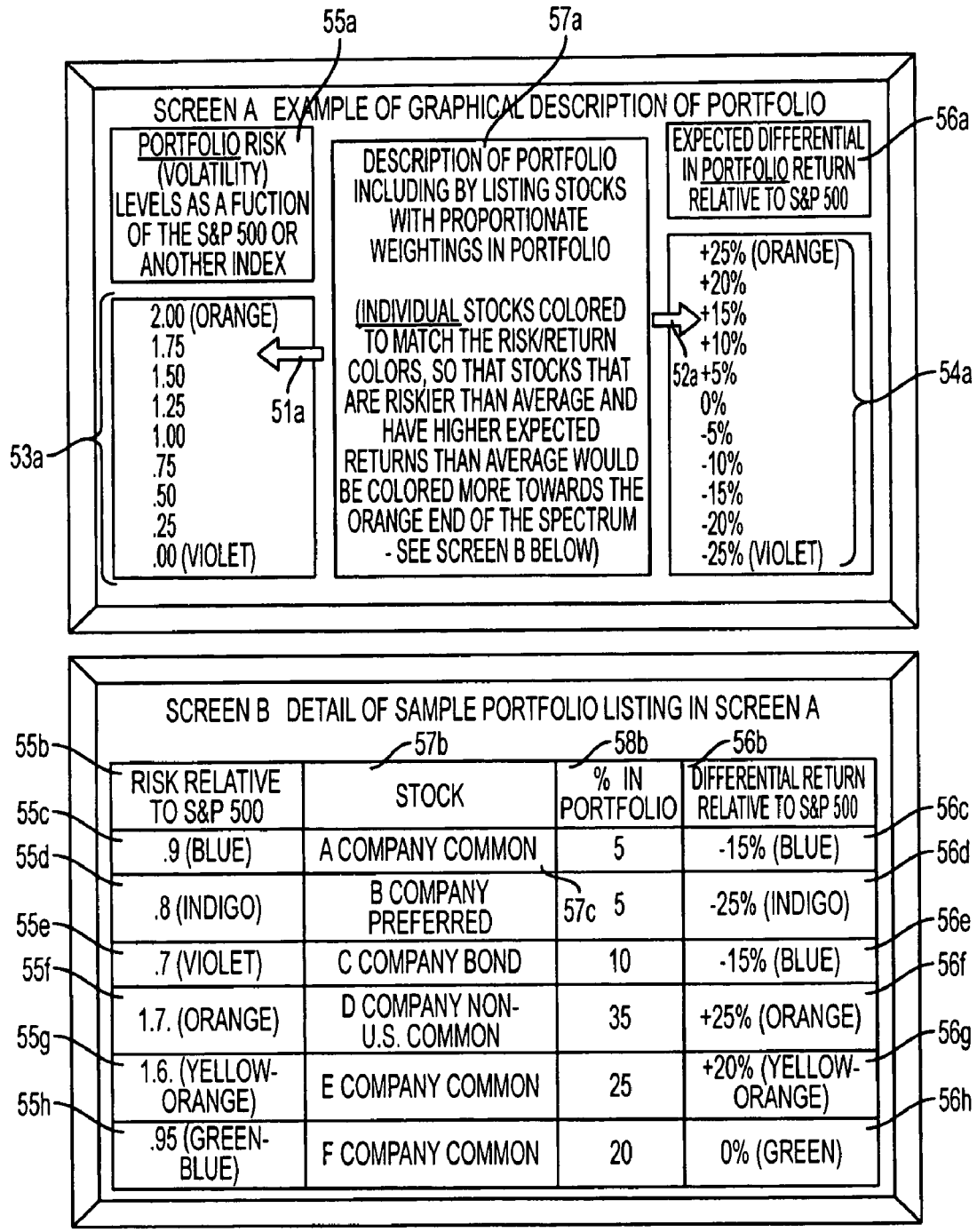
FIG. 13 depicts certain screens presented to a user during various steps in the process of creating or modifying a portfolio according to the computer-based system of the present invention.

FIG. 13 depicts certain screens that may be presented to the user during various steps in the process of creating or modifying a portfolio.

Screen A shows one form of a general presentation of the risk 55a and expected differential in return 56a of a chosen portfolio 57a of six stocks. The benefits of diversification can be obtained by using a number of securities in the portfolio, with the number usually being in excess of twenty. In actual operation then, the number of securities in the portfolio would generally be at least twenty or more since, as noted, part of the purpose of the invention is to allow the benefits of diversification to be provided to the user. Consequently, unless the user determines otherwise, the number of securities in a portfolio will usually be at least twenty and generally would be materially higher.

As the user increases or decreases the relative percentage of the stocks (six shown in this example) in the portfolio there will be a corresponding adjustment in the risk 55a and return 56a for the portfolio with the pointers 51a, 52a either moving up or down. In this example, the strips 53a, 54a along which the pointers 51a, 52a, respectively, move would be color-coded (much like a litmus testing strip). The color-coding will be used in connection with the presentation of the individual stocks in the portfolio as shown in Screen B. The pointers 51a, 52a could be a dial, or any other device for showing one value relative to another, and could be used with or without the color-coding.

Screen B shows a detail of Screen A with the stocks specified and their relative contributions to the portfolio and their respective risks 55b and differential returns 56b. A user will instantly be able to determine which stocks are contributing higher levels of risks and presumably higher levels of returns to the portfolio and, if desired, adjust them to modify the risk/return levels in the portfolio (but see below). Alternatively, the user could adjust the pointers 51a, 52a in Screen A up or down and the system will recalculate the required mix of the portfolio's stocks. Obviously, a number of combinations will not be available as limited by the specific stocks selected. The system generates a statement that the combination requested is not possible and suggest alternatives such as other securities (e.g., money market funds or preferred stocks or AAA-rated short-term notes, which in a real portfolio would be added to the mix in Screen A or B) that could lower overall risk and returns or leveraging (which would be shown as a bar increasing the risk of the portfolio) that could increase it, or different stocks with different characteristics, depending on what preferences the user had earlier inputted into the system. Screen B also shows the calculation of the risk (beta) 55b–55h and expected differential return levels 56b–56h for the stocks that are used to calculate the portfolio risk levels 53a and the expected differential returns 54a of the portfolio. It would also be made clear that a principal benefit of the computer-based system of the present invention and the concept of using a portfolio for investing instead of individual stocks is the notion that the riskiness in any one stock held in a portfolio may be different from the riskiness of that stock held by itself (thereby generating some of the benefits that stem from diversification, etc.). Consequently, users will be cautioned to focus on portfolio risk/returns, not individual stock risk/return.

The scales, etc. can all be adjusted to make the presentation easier to see for different portfolios.

Thus, shown in screen B, Common stock in company A 57c has a risk relative to the S&P 500 of 0.9 (which is blue on the color coded litmus test example) 55c, it represents 5% of the total value of the portfolio, and its differential return with respect to the S&P 500 is negative 15% 56c, which is also depicted in blue. Each of the remaining stocks is represented in a similar manner. In this example, the stocks are listed in alphabetical order, however, they could be ordered in a different manner depending on a user preference selection. For example, the user could adjust the ordering to depict the stocks in order of total value of the portfolio, from low to high risk or vice versa, etc.

An Exemplary Embodiment of the Computer-Based System of the Present Invention

Figure 14:
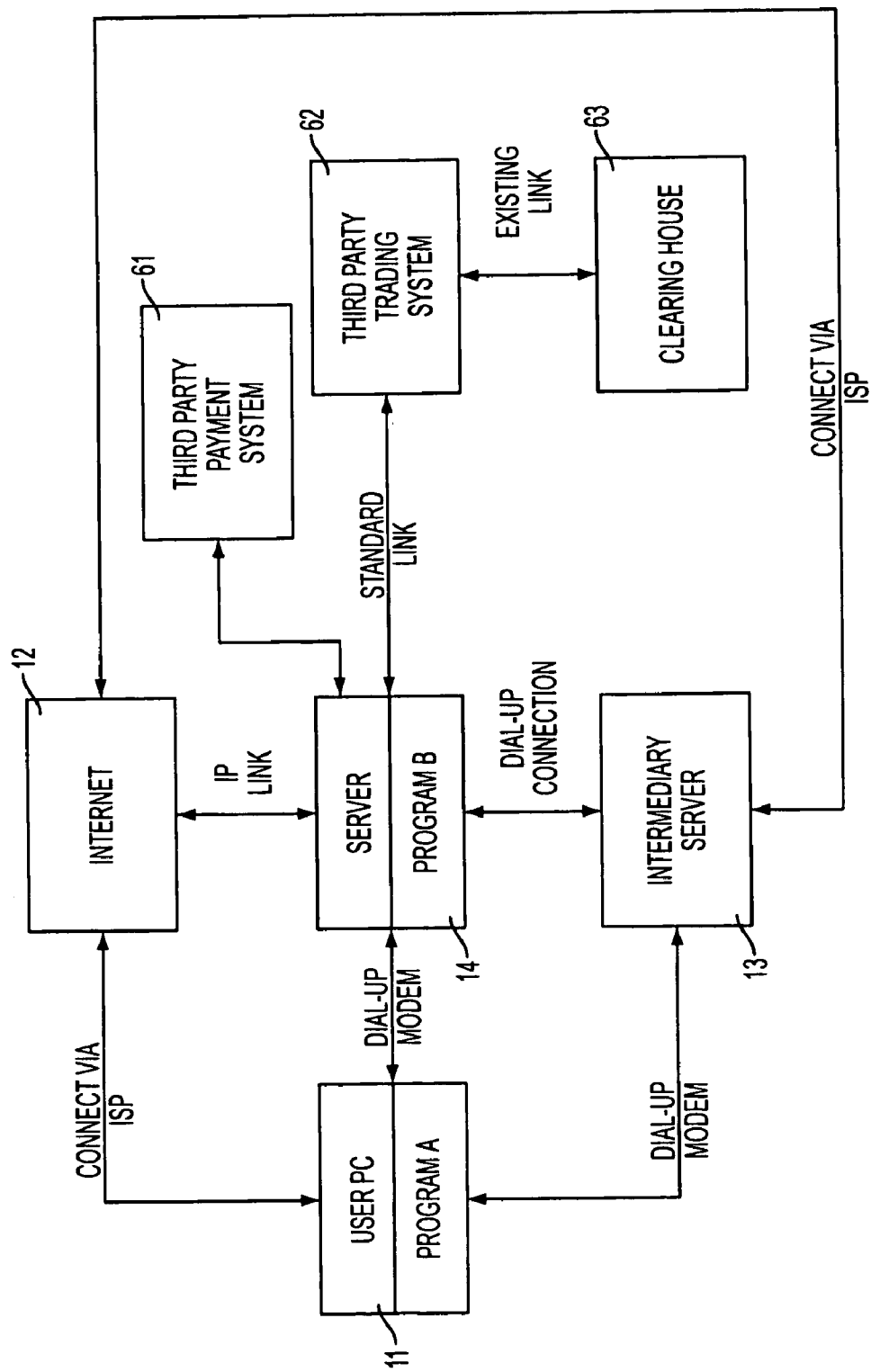
FIG. 14 depicts a block diagram of an exemplary computer-based system according to the present invention interacting with existing systems.

FIG. 14 depicts an exemplary embodiment of the overall system according to the computer-based system of the present invention. Within the computer-based system of the present invention is a server 62, which executes a program B, which controls the operation of the entire system. While another program may execute on the user's PC 63, program A, the user's program can be completely performed by program B. Alternatively, these two programs A and B can work together like Pointcast, or other similar programs, which download data to a user's terminal and display this data via a graphical user interface based on "filter" selections made by the user. Thus, one possibility for program A is that it is merely a communication program that enables the user to establish a link to the server 62, and set "filters," which determine what data is sent back and forth to the user. In this case, the so-called filters consist of the stocks in the user's portfolio and the user's risk model, etc. Once established by the user, the program B then performs all of the analysis and computation required to advise the user as to the levels of risk and differential return inherent in the user's portfolio relative to known standards. This enables tight configuration control on the user software, which makes upgrading and security protection much easier.

Alternatively, by placing more of the user's program functionality in program A, the amount of time the server 62 is accessed by the user is minimal, thereby enabling a cost reduction in the total amount of communication links required at the server 62. In this embodiment, the user would only access the server to receive the data regarding the user's stocks and to pass on new orders once the user determined a new order. The total time accessing the server would be similar in this case to accessing one's electronic mail. Thus, there is much flexibility in creating the levels of functionality in the two main programs A and B.

In addition, the user can access the server 62 via several communication links. First, the user can access the server 62 via the Internet 64 using the user's Internet Service Provider (ISP), which ultimately connects the user's PC 63 to the server 62.

Second, the user can access the server directly using a dial-up modem connection. This has the advantage of security in that many consider a telephone connection inherently more secure than an open connection over the Internet.

Third, the user can access the server 62 using an intermediary, which provides the service to the user, such as a bank, brokerage, etc. In this case, the user either accesses the intermediary 65 using a dial-up modem, or via the Internet 64. Once the user accesses the intermediary 65, the intermediary 65 then accesses the server 62 using either an Internet connection or a dial-up connection.

The computer-based system of the present invention also provides for an electronic payment mechanism 66 to enable the user to make payments or transfer funds for investment or otherwise on a periodic basis, such as monthly, biweekly, etc. This would enable a user to match his investments with his regular salary. The electronic payment mechanism 66 includes an electronic withdrawal from the user's checking/savings account, a payroll deduction, a credit card transaction, etc.

An electronic connection to a third party trading system 67 is also provided, which enables the program to make the trades electronically. Typically, these electronic trading systems 67 include a connection to a clearinghouse 68 for settlement of the trades. While not part of the present invention, this is shown for completeness.

All of these communications links are standard and known communications links, hence no further discussion is necessary. In addition, the third party electronic payment system connection consists of one of the many known ways of making this payment electronically, so no further discussion is required either. Finally, the third party trading system could consist of a known trading system, such as Optimark, or other trading system that communicates using the Financial Information eXchange (FIX).protocol, hence no additional discussion is required.

Discussion of the Operation of the Computer-Based System of the Present Invention The computer-based system of the present invention is designed to provide a mechanism for a whole new financial investing system that currently does not exist. It allows investors, with expert assistance, to create, manage and modify a complex portfolio that reflects the investor's own preferences. It allows the user to ensure that his portfolio is diversified and that it reflects the level of risk he wishes to assume. The computer-based system of the present invention also increases the investor's control over matters like what stocks he owns, the taxes he pays, and how his shares will be voted. And it permits him to purchase and sell specific securities, and fractional interests in shares of securities—all for a low cost that is less than or competitive to discount brokers and mutual funds.

Investors ("Users" in FIG. 6) access a server that processes the information necessary to enable the investor to create or modify a portfolio in accordance with the computer-based system of the present invention. This access is either through the Internet, through a dial-up modem connection or through an intermediary such as a bank or brokerage that is making the invention available to investors.

Users first accessing the system are provided a range of security measures to accommodate their own computer systems and their own concerns. For example, secure encrypted access will be supported for those users who have it as part of their Internet browsing capability. Dial-up modem could also be available, for those who wish not to rely on the Internet, or users could also access the system through an intermediary that possesses its own security controls and has a secure link to the invention processing site, such as a broker or bank.

In addition, security may be effected through a dial-back or dial-up mechanism. Users accessing the system over the Internet for the first time will be provided a password and log-on identification without having to provide any confidential information, such as credit card information, to the processing site. The site will then call the user back at a number supplied by the user, or the user can access the site through a direct telephone call. The user can then supply the processing site with the necessary information by touch-tone input of the site assigned password and the user's confidential credit card information. Once the site has the credit card information through direct telephone connection, it need not be provided to the site again and the user then uses the user-site-specific password and log-on identification for communications. Those passwords and log-ons will be useless for any purpose other than communication with the site, and the credit card information never travels on the Internet.

Once the user accesses the site though whatever means, initial screens solicit vital information about the investor, such as range of income, other investments, age, financial responsibilities and financial goals and liabilities.

Users are then provided information that solicits their preferences as to "risk" and "diversification." Their responses provide the invention the information it needs for its algorithms to work properly.

Based on this information, the invention suggests a general investment asset allocation that the user can modify. Such asset allocation models are relatively standard and in current use. However, the standard models can be adjusted by the user for use in the system to allow the user to incur additional risk in order to achieve a higher return. The reason for permitting a higher risk-return level than normal is because the user will be provided the opportunity through the invention to fine-tune—and monitor and maintain—the level of risk (based on a stock's historical volatility) selected by the user for the user's portfolio.

This fine tuning of portfolio risk will be far more than would ordinarily be the case, for example, for a user attempting to select a mutual fund, because the user utilizing the invention is able to ensure that the selected investments and their risk profile remain subject to the user's control. In a mutual fund (other than passive or "non-managed" funds), the user has no assurance as to what stocks, and what weighting of stocks, will be included in the fund in the future, or how much of the fund will be held in cash, and therefore no assurance that the fund will not modify its style and "risk" without the user having advance knowledge of the change. Even in passive funds there is uncertainty as to how much of the fund is held in cash at any one time. Consequently, the mutual fund investor incurs the additional risk of the uncertainty as to a mutual fund's risk profile, thereby increasing the user's level of risk without the user obtaining any benefit.

Once the general asset allocation determinations and risk-return preferences are made, users are asked, through simple screens, about any preferences they have regarding stocks, such as where securities are listed, capitalization, and business sector; various financial factors such as price/earnings ratio and growth trends, and corporate governance factors such as whether the company sells specified products, or enjoys good labor relations, etc. (Determinations regarding subjective criteria, such as whether a company has "good" or "bad" governance factors, would generally come from third party sources.)

- A user could then specify specific stocks that must, or must not, be included in the portfolio. Consequently, the invention also acts as an ordinary broker—with a very low cost that would be expected to be materially less than even deep discount brokers—when immediate execution is not required.
- If an investor seeks immediate execution for a selected trade, the invention will provide it, in the same manner as would any other electronic discount brokerage, for a fee competitive with that charged by the reputable discount brokers.
- After preferences are entered, the invention will create a diversified portfolio that expertly matches, to the extent possible, those preferences and the asset allocation determination—all automatically.
- If the portfolio is acceptable, the investor will enter the dollar amount to be invested and the securities will be purchased for the investor at the invention's next "transaction window".
- For the invention to work, costs must be kept low so that users can purchase and modify whole portfolios of securities on a frequent basis. To accomplish this, the invention aggregates the orders entered by the users utilizing the invention. The orders are aggregated not for the purpose of attempting to match one user's order against another user's order, but to reduce the number of actual transactions required to be executed by the system. The number of aggregations will depend on the number of users of the system, their usage and other factors, but it is currently contemplated that orders would be aggregated into those received when the market is closed, those received in the morning, and those received in the afternoon, with transactions effected at the market open, mid-day and at the market close. If demand warrants, and other factors make it permissible, transactions could also be effected at other times—such as in the evening or more frequently during the day, if there is a market from which prices can be derived or if there is a market maker willing to make a market at that time and if it appears that effecting a transaction at such time would be consistent with the interests of users.

Shares can be bought in very, small odd lots (one or two shares), and even in fractions—purchases not possible on a cost-effective basis with ordinary brokerage.

All user actions can be automated, with specified amounts being added each week or month from direct deposits and with selected stocks sold or bought depending on whether they satisfy certain criteria.

In subsequent sessions, the investor can modify his portfolio any way he wishes, including to reflect new preferences, add to it with additional dollars invested, or sell some or all of the securities in the portfolio.

The invention will track the tax "basis" in stock purchases, and which stocks have gains and which have losses: so an investor can choose to sell stocks to generate capital gains or losses and thereby manage tax effects.

Moreover, because the investor actually owns the individual securities in the portfolio, instead of just an interest in a fund, the investor has the right to vote the underlying stocks (or delegate the voting to the invention in accordance with various instructions), and sell individual stocks when he wishes.

The computer-based system of the present invention, therefore, provides complete "hands on" portfolio management for the user who wishes it—those who employ discount brokerage, and those who select mutual funds on their own—and simple, automatic and expert management for a user who wishes to be completely "taken care of".

The strengths and advantages of the invention include relative to mutual funds:

- the selection of individual securities to be included in a portfolio;
- management of tax effects;
- the ability to make specific modifications to the portfolio at least three times a day, including the ability to buy and sell securities as a block at the open, mid-day or close instead of just at the next close as is the case with mutual funds;
- the inclusion of world class securities or selection by sector, price/earnings ratio, governance policies, industry or other factors to suit investors' preferences at levels not available in mutual funds;
- the ability to exercise voting and other shareholder and corporate governance rights and decisions—such as whether to tender securities in a takeover;
- the ability to control selectively reinvestment of dividends;
- the ability to fine-tune risk-return preferences with complete control over what will be included in the portfolio and whether there will be a change in investment strategy; and
- the ability to manage costs better.

Those strengths and advantages relative to discount brokerages include:

- inexpensive and cost-effective manner of creating a diversified portfolio;
- the ability to acquire small odd lots and fractional shares in multiple securities at reasonable costs;
- far less cost in purchasing and selling individual securities (assuming immediate execution is not required)—as compared even to the deepest discount brokers;
- monitoring of portfolio based-tax effects;
- assistance in defining diversification and selection of stocks that satisfy diversification goals;
- assistance in defining other factors and investor preferences and selection of stocks that satisfy those other preferences and goals; and
- a likelihood of obtaining better execution than can be obtained through discount brokers due to matching of trades.

Other Applications

The computer-based system of the present invention can be used by ordinary investors to manage other "things" such as options and commodities trading, bonds, foreign equities, or used for investment banking for the trading of, for example, derivatives. The computer-based system of the present invention can be used to establish a system to create and manage a portfolio of any assets or liabilities or combination thereof that can be traded, and provides benefits whenever diversification is an advantage (as would be the case with most financial assets). For example, as described above the invention could be used for any security, including foreign or domestic equities, options, warrants, bonds, notes, limited partnership interests or otherwise. In addition, the invention could be used for commodities, futures, bank loan syndication interests and novel assets or liabilities that are traded such as pollution rights or insurance claim interests. The method of: 1) obtaining preferences for portfolio characteristics of users; 2) employing those preferences to describe and select items to be transacted; 3) aggregating such transactions over an applicable characteristic, such as a time period (for example, every three hours) or a time certain (for example, at 9:30 am, 12:30 pm and 4:30 pm) or an amount (for example, having 1,000 transactions aggregated) or otherwise; and 4) executing the transactions as aggregated and, if applicable, netted, transactions can be applied to any of these items.

In addition, obtaining user risk preferences and other information allows for appropriately focused private placement and other opportunities to be presented to users.

What is claimed is:

1. A computer implemented method using aggregation for enabling a user to create and trade a plurality of market tradable assets or liabilities as a single, customizable investment portfolio comprising:

receiving trading data from the user including user identification and preference information;

specifying from the trading data a user customizable portfolio of a plurality of distinct market tradable assets or liabilities to be owned directly by the user;

receiving from the user an order to trade the specified user customizable portfolio as a whole;

determining, based on said order to trade, a plurality of distinct market tradable assets or liabilities to be transacted in a market for each of the distinct assets or liabilities in a plurality of transactions for the user;

aggregating the plurality of transactions for the user with a plurality of transactions for one or more other users over an applicable characteristic of the plurality of assets or liabilities, wherein said aggregating includes aggregating single shares, odd lots and/or fractional shares using a computer; and executing one or more trades based on said aggregating to implement the order to trade the specified user customizable portfolio;

wherein the specified user customizable portfolio is owned directly by the user after said one or more trades.

2. The method according to claim 1, wherein the order to trade the specified user customizable portfolio as a whole is based on a single instruction by the user via a graphical user interface.

3. The method according to claim 1, wherein said preference information includes input to an asset allocation model and further comprising creating a resulting percentage allocation of investment classes for the user based on said asset allocation model input.

4. The method according to claim 1, further comprising transmitting a request for an electronic payment for the user to a third party payment system, and receiving, in response to said request, electronic payment data for the user electronically from the third party payment system.

5. The method according to claim 4, further comprising maintaining a payment account for the user.

6. The method according to claim 5, further comprising permitting trading of the assets or liabilities for the user only if the user's payment account contains at least a predetermined monetary amount.

7. The method according to claim 1, wherein aggregating single shares, odd lots and/or fractional shares comprises generating a single buy order and/or a single sell order for at least one of the assets or liabilities.

8. The method according to claim 7, wherein said executing one or more trades comprises transmitting the single buy order and/or the single sell order to an electronic trading system.

9. The method according to claim 1, further comprising prompting the user for the user identification and preference information, and enabling the user to select a plurality of assets or liabilities to create a user portfolio commensurate with a percentage allocation of investment assets, and to have parameters and limitations established as to portfolio characteristics that will be permitted for the user.

10. The method according to claim 1, further comprising creating or modifying the user's portfolio to ensure the user's actual portfolio matches the user's desired portfolio in accordance with the user's preference information.

11. The method according to claim 1, wherein the plurality of transactions include an order to trade at least one of the assets or liabilities according to a periodic monetary contribution to the user portfolio.

12. The method according to claim 11, wherein the periodic monetary contribution includes one or more of the following: a weekly contribution, a monthly contribution and an annual contribution.

13. The method according to claim 1, further comprising receiving an order to trade by at least the user or one of the plurality of other users a fractional share of at least one of the assets or liabilities.

14. The method according to claim 1, further comprising receiving an order to trade by at least the user or one of the plurality of other users an odd lot of shares for at least one of the assets or liabilities.

15. The method according to claim 1, further comprising receiving an order to trade by at least the user or one of the plurality of other users a small number of shares for at least one of the assets or liabilities.

16. The method according to claim 1, further comprising maintaining a tax basis for one or more of the assets or liabilities traded for the user.

17. The method according to claim 1, further comprising providing information to the user regarding voting rights of the assets or liabilities held by the user.

18. The method according to claim 7, further comprising receiving actual trading pricing information regarding the single buy order and/or the single sell order for at least one of the assets or liabilities.

19. The method according to claim 18, further comprising transmitting to the user actual trading pricing information regarding each asset or liability traded for the user.

20. The method according to claim 18, further comprising modifying a display of risk and differential return of the user portfolio relative to a standard industry measurement in accordance with the actual trading pricing information for at least one of the assets or liabilities traded for the user.

21. The method according to claim 18, further comprising recommending modifications to the user portfolio to the user via a graphical user interface to make the user portfolio match a percentage allocation previously determined if the user portfolio no longer matches the percentage allocation as a result of the actual trading pricing information received.

22. The method according to claim 1, further comprising displaying a graphical user interface on a predetermined world wide web site via which the user can provide user identification information.

23. The method according to claim 1, further comprising the step of displaying on a graphical user interface risk and differential return of the user portfolio relative to a standard industry measurement as one selected from the group consisting of: a color code, a numerical indicator, and an arrow on a dial.

24. The method according to claim 1, further comprising the step of displaying on a graphical user interface risk and differential return of the user portfolio relative to a standard industry measurement as an arrow on a range of numerical values.

25. The method according to claim 23, further comprising the step of changing the portfolio characteristics in response to the user changing one selected from the group of: the color code, the numerical indicator, and the location of the arrow on the dial.

26. The method according to claim 24, further comprising the step of changing the portfolio characteristics in response to the user changing the location of the arrow on the range of numerical values.

27. The method according to claim 1, further comprising automatically downloading an updated version of a graphical user interface program upon detection of an out of date version.

28. The method according to claim 1, wherein the step of aggregating the plurality of transactions comprises the step of aggregating the plurality of transactions over a time period.

29. The method according to claim 28, wherein the time period includes every three hours.

30. The method according to claim 1, wherein aggregating the plurality of transactions comprises aggregating once per day at a time certain.

31. The method according to claim 1, wherein aggregating the plurality of transactions comprises aggregating a plurality of times per day at a plurality of predetermined times.

32. The method according to claim 1, wherein aggregating the plurality of transactions comprises aggregating over an amount of transactions.

33. The method according to claim 1, further comprising the step of netting buy orders against sell orders within the plurality of transactions for the user and for the one or more other users to obtain either a single buy order or a single sell order for at least one of the assets or liabilities after aggregating the plurality of transactions, and wherein said executing one or more trades comprises executing the single buy order or the single sell order.

34. The method according to claim 33, wherein executing the single buy order or the single sell order comprises sending the single buy order or the single sell order to an electronic trading system.

35. The method according to claim 1, further comprising:
a) receiving data from each user of the plurality of other users regarding an amount of money to be invested in a portfolio for each respective user for a predetermined period, and
b) accessing an electronic payment system upon receiving instructions from said each user to purchase said each respective portfolio of assets or liabilities to obtain payment for the required purchases.

36. The method according to claim 35, wherein said executing one or more trades comprises sending the aggregated transactions as a single trade in each asset or liability to an electronic trading system.

37. The method according to claim 36, further comprising netting buy orders against sell orders before sending the aggregated trades to the trading system.

* * * * *